(12) United States Patent
Kubota et al.

(10) Patent No.: US 12,233,821 B2
(45) Date of Patent: Feb. 25, 2025

(54) VEHICLE CLEANER UNIT AND VEHICLE CLEANER SYSTEM

(71) Applicant: KOITO MANUFACTURING CO., LTD., Tokyo (JP)

(72) Inventors: Akinobu Kubota, Shizuoka (JP); Yoshiaki Fushimi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 648 days.

(21) Appl. No.: 17/418,604

(22) PCT Filed: Dec. 19, 2019

(86) PCT No.: PCT/JP2019/049894
§ 371 (c)(1),
(2) Date: Jun. 25, 2021

(87) PCT Pub. No.: WO2020/137823
PCT Pub. Date: Jul. 2, 2020

(65) Prior Publication Data
US 2022/0063567 A1    Mar. 3, 2022

(30) Foreign Application Priority Data

Dec. 26, 2018 (JP) .................. 2018-242209
Dec. 26, 2018 (JP) .................. 2018-242210
(Continued)

(51) Int. Cl.
*B60S 1/54*    (2006.01)
*B60R 19/48*   (2006.01)
(Continued)

(52) U.S. Cl.
CPC ............ *B60S 1/54* (2013.01); *B60R 19/48* (2013.01); *B60R 19/52* (2013.01); *B60S 1/56* (2013.01); *B60S 1/60* (2013.01)

(58) Field of Classification Search
CPC .. B60S 1/54; B60S 1/542; B60S 1/544; B60S 1/528; B60S 1/56; B60S 1/023; B60R 19/48; B60R 19/52
(Continued)

(56) References Cited

U.S. PATENT DOCUMENTS 1,537,951 A * 5/1925 Korach ............... B60S 1/54
                                                          15/313
2,240,013 A * 4/1941 Gale ................... B60S 1/54
                                                          239/416.5
(Continued)

FOREIGN PATENT DOCUMENTS

JP    S51106374 A    9/1976
JP    S5646450 U     4/1981
(Continued)

OTHER PUBLICATIONS

Machine translation of description portion of WO 03/033318 publication, published Apr. 2003. (Year: 2003).*
(Continued)

*Primary Examiner* — Gary K. Graham

(57) ABSTRACT

A vehicle cleaner unit is configured to clean a cleaning object mounted near a bumper or a grille of a vehicle. The vehicle cleaner unit includes a blower configured to be attached to a rear surface of the bumper or the grille. The bumper or the grille is provided with an air outlet for jetting air blown from the blower toward the cleaning object.

4 Claims, 17 Drawing Sheets

(30) Foreign Application Priority Data

| Dec. 26, 2018 | (JP) | ................................ | 2018-242211 |
| Dec. 26, 2018 | (JP) | ................................ | 2018-242212 |
| Dec. 26, 2018 | (JP) | ................................ | 2018-242213 |
| Dec. 26, 2018 | (JP) | ................................ | 2018-242214 |
| Dec. 26, 2018 | (JP) | ................................ | 2018-242215 |
| Jun. 4, 2019 | (JP) | ................................ | 2019-104462 |

(51) Int. Cl.
  *B60R 19/52* (2006.01)
  *B60S 1/56* (2006.01)
  *B60S 1/60* (2006.01)

(58) Field of Classification Search
  USPC ............... 15/250.003, 313; 239/284.1, 284.2
  See application file for complete search history.

(56) References Cited

U.S. PATENT DOCUMENTS

| 3,423,026 | A | * | 1/1969 | Carpenter | ................ | B60S 1/48 |
| | | | | | | 15/313 |
| 5,097,563 | A | * | 3/1992 | Cowan | ..................... | B60S 1/56 |
| | | | | | | 15/313 |
| 5,419,005 | A | * | 5/1995 | Mori | ...................... | B60S 1/544 |
| | | | | | | 15/313 |
| 5,546,630 | A | * | 8/1996 | Long | ...................... | B60S 1/603 |
| | | | | | | 15/313 |
| 5,546,631 | A | * | 8/1996 | Chambon | ............... | B08B 5/023 |
| | | | | | | 15/345 |
| 5,930,455 | A | * | 7/1999 | Kanna | ................... | F24H 3/0429 |
| | | | | | | 392/383 |
| 2015/0093981 | A1 | * | 4/2015 | Fusco | ..................... | B60S 1/023 |
| | | | | | | 454/75 |
| 2020/0180569 | A1 | * | 6/2020 | Seo | .......................... | B60S 1/54 |

FOREIGN PATENT DOCUMENTS

| JP | S62225419 A | 10/1987 |
| JP | S6374753 A | 4/1988 |
| JP | H01103560 A | 4/1989 |
| JP | H02021121 U | 2/1990 |
| JP | 2001171491 A | 6/2001 |
| JP | 2007112261 A | 5/2007 |
| JP | 2016187990 A | 11/2016 |
| JP | 2018100011 A | 6/2018 |
| WO | WO 03/033318 | * 4/2003 |

OTHER PUBLICATIONS

International Search Report issued in corresponding International Application No. PCT/JP2019/049894; mailed Mar. 10, 2020 (12 pages).

Written Opinion of the International Searching Authority issued in corresponding International Application No. PCT/JP2019/049894; dated Mar. 10, 2020 (8 pages).

* cited by examiner

FIG.9
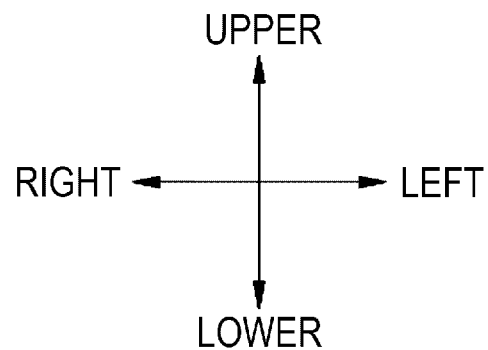
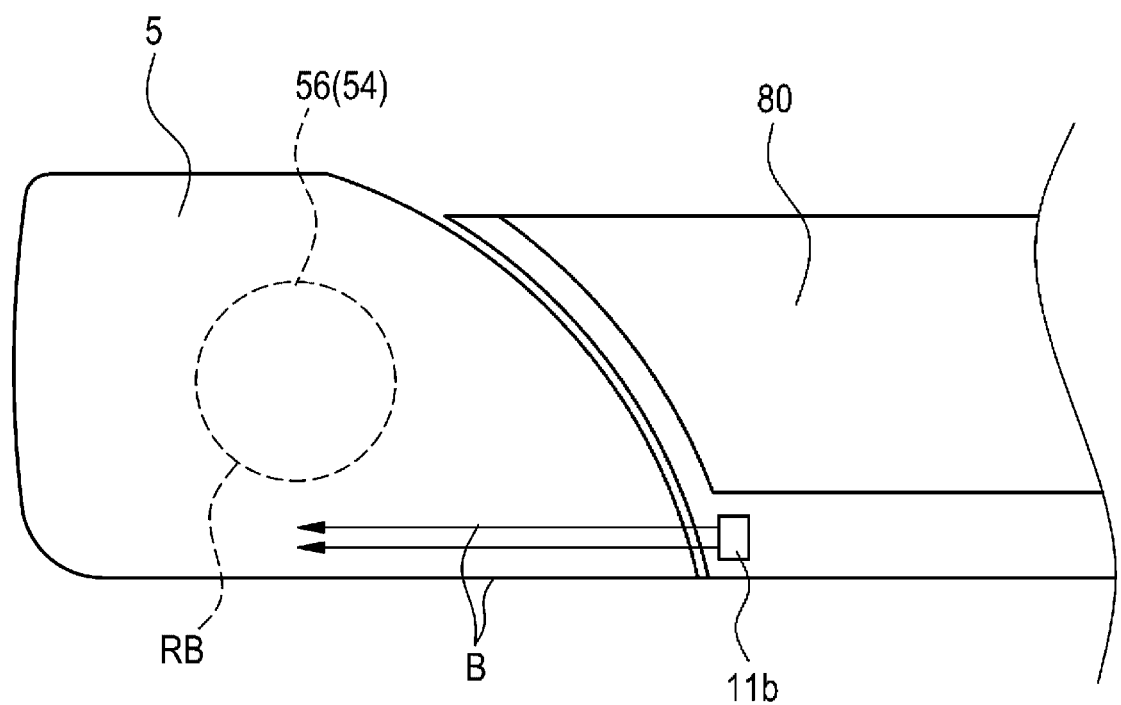

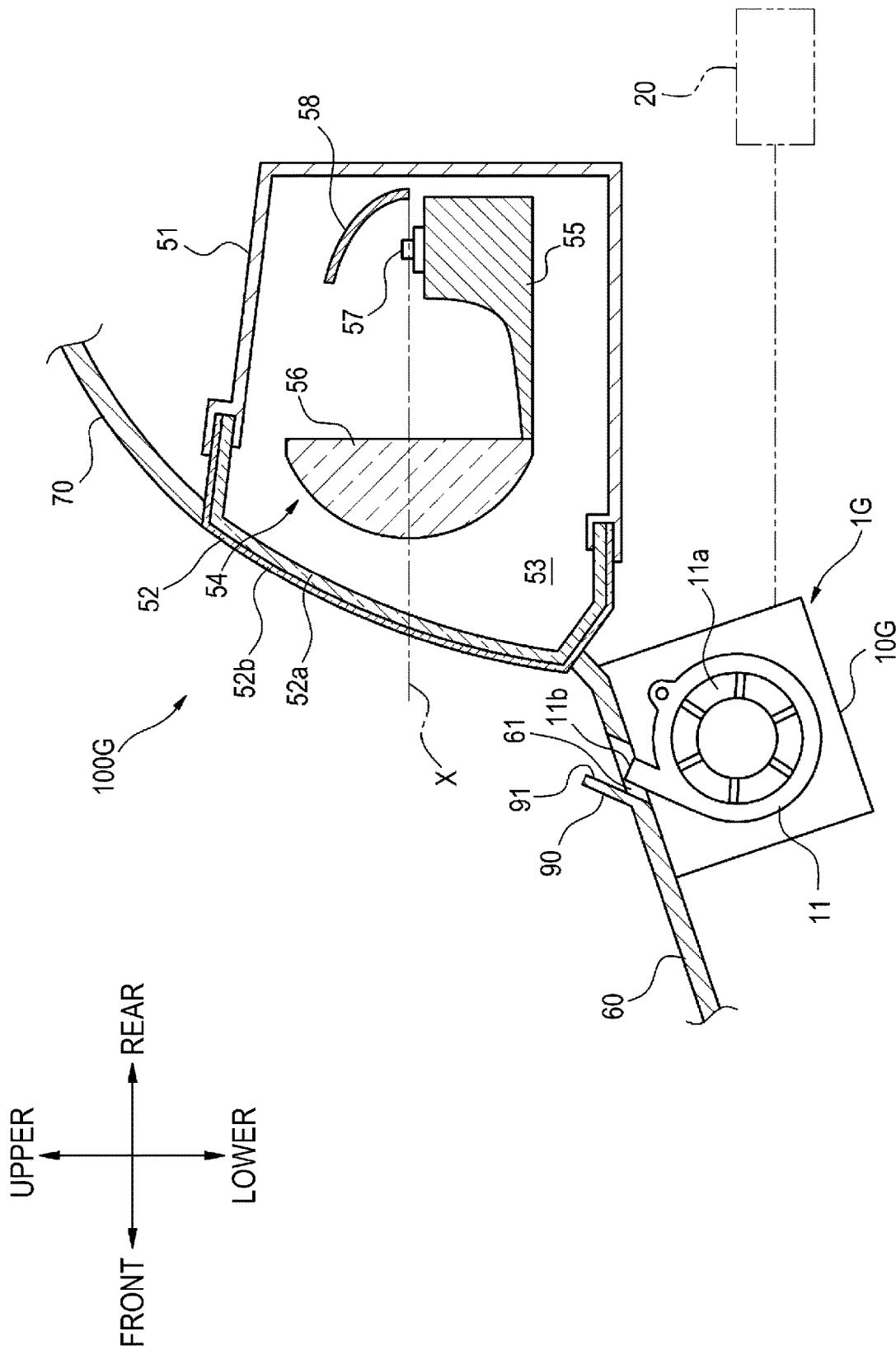

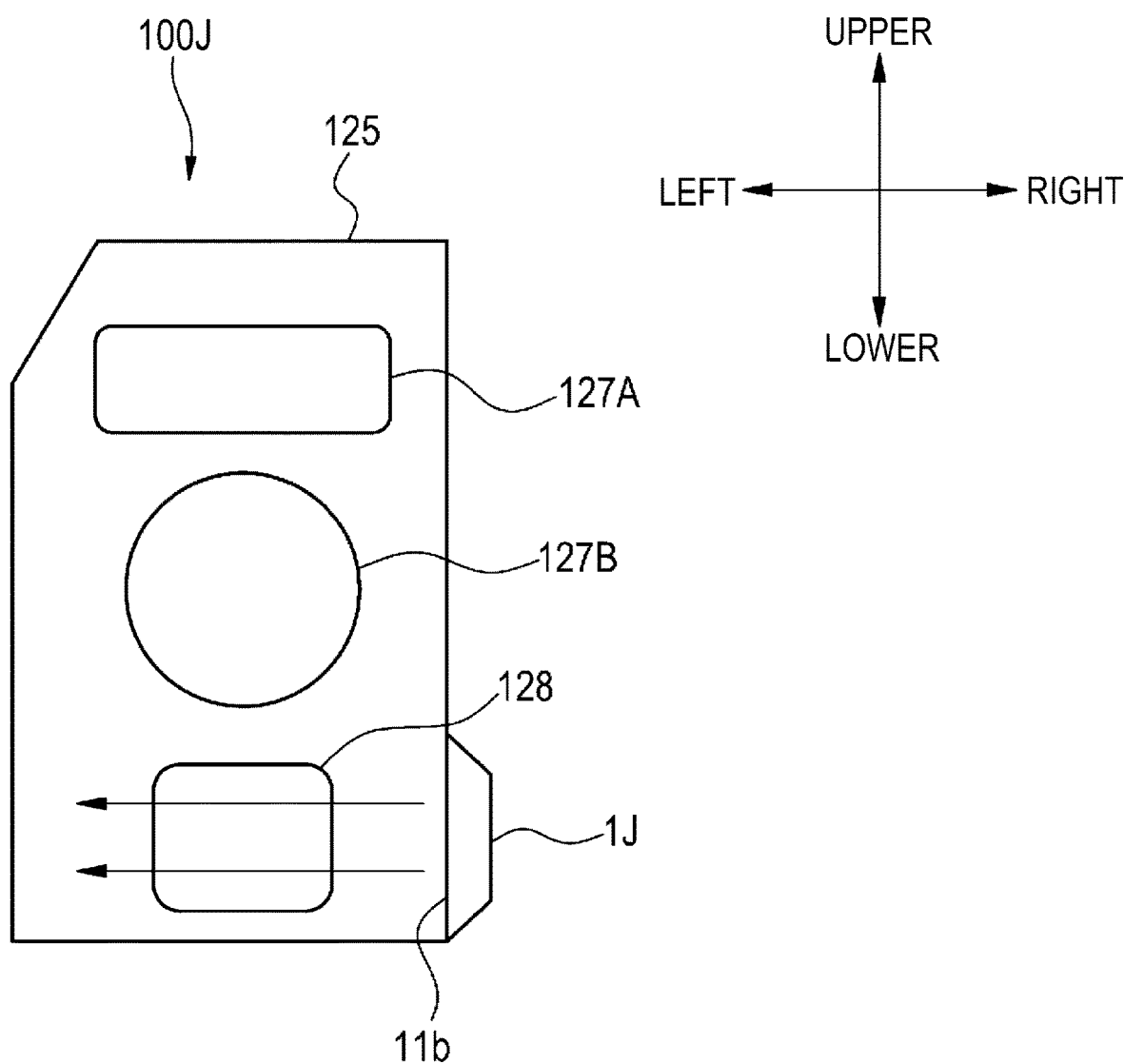

VEHICLE CLEANER UNIT AND VEHICLE CLEANER SYSTEM

TECHNICAL FIELD

The present disclosure relates to a vehicle cleaner unit and a vehicle cleaner system.

BACKGROUND ART

In recent years, the number of vehicles equipped with an in-vehicle camera that images the situation around the vehicle is increasing. A lens of the in-vehicle camera, which is an imaging surface, may become dirty due to rain, mud, and the like. Therefore, a cleaner for removing foreign substances by blowing a cleaning liquid, compressed air, and the like to a lens of an in-vehicle camera to remove foreign substances such as water droplets adhering to the lens is known in the related art.

For example, Patent Literature 1 proposes a configuration in which a compressed air generating unit is installed in the vicinity of the in-vehicle camera, compressed air of the compressed air generating unit is jetted from a nozzle, high-pressure air is blown to a front glass of the in-vehicle camera, and thus water droplets adhering to the front glass are removed (see Patent Literature 1).

CITATION LIST

Patent Literature

Patent Literature 1: JP2001-171491A

SUMMARY OF INVENTION

Technical Problem

There is room for improvement in an installation location of the foreign substance removal device and a jetting mode of the cleaning medium from the foreign substance removal device as disclosed in Patent Literature 1.

In view of the above, an object of the present disclosure is to provide a vehicle cleaner unit and a vehicle cleaner system that can efficiently and effectively blow air to a cleaning object attached to a vehicle and can be attached in a space-saving manner without impairing a design of the vehicle.

Furthermore, a problem may occur due to water or the like intruding the foreign substance removal device as disclosed in Patent Literature 1.

In view of the above, it is an object of the present disclosure to provide a vehicle cleaner unit and a vehicle cleaner system capable of preventing intrusion of water or the like.

Furthermore, in the foreign substance removal device disclosed in Patent Literature 1, air may not be appropriately jetted to the cleaning object due to influence of traveling wind of the vehicle.

In view of the above, it is an object of the present disclosure to provide a vehicle cleaner unit and a vehicle cleaner system capable of preventing influence of traveling wind.

Solution to Problem (1) In order to achieve the above object, a vehicle cleaner unit according to an aspect of the present disclosure is:

a vehicle cleaner unit configured to clean a cleaning object mounted near a bumper or a grille of a vehicle, the vehicle cleaner unit including:
a blower configured to be attached to a rear surface of the bumper or the grille, in which
the bumper or the grille is provided with an air outlet for jetting air blown from the blower toward the cleaning object.

According to the vehicle cleaner unit of the present disclosure, the air is blown from the blower toward the cleaning object through the air outlet opened in the bumper or the grille. This makes it possible to efficiently blow air to the cleaning object provided near the bumper or the grille. In addition, since the blower is attached to the rear surface of the bumper or the grille, it is possible to save space without impairing the design of the vehicle.

(2) In order to achieve the above object, a vehicle cleaner unit according to an aspect of the present disclosure is:

a vehicle cleaner unit configured to clean a cleaning object mounted on a vehicle, the vehicle cleaner unit including:
a blower configured to be attached to a housing of the cleaning object, in which
a design component of the vehicle is provided with an air outlet for jetting air blown from the blower toward the cleaning object.

According to the vehicle cleaner unit of the present disclosure, the air is blown from the blower attached to the housing of the cleaning object toward the cleaning object through the air outlet opened in the design component of the vehicle. This makes it possible to efficiently blow air to the cleaning object. In addition, since the blower is attached to the housing of the cleaning object, it is possible to save space without impairing the design of the vehicle.

(3) In the vehicle cleaner unit disclosed in Item (2),
the design component may be at least one of a front bumper, a rear bumper, or a front grille.

According to this configuration, since the air outlet is provided in the front bumper or the like, it is possible to efficiently jet the air to the cleaning object, such as the vehicle lamp, without greatly damaging the design of the vehicle.

(4) In order to achieve the above object, a vehicle cleaner unit according to an aspect of the present disclosure is:

a vehicle cleaner unit configured to clean a cleaning object mounted on a vehicle, in which
the vehicle cleaner unit is configured with a blower, and
a blowing direction of air jetted from the blower toward the cleaning object is along a left-right direction of the vehicle.

According to the vehicle cleaner unit of the present disclosure, air is blown from the blower toward the cleaning object along the left-right direction of the vehicle. As a result, for example, when there is space on both left and right sides of the cleaning object, efficient blowing becomes possible.

(5) In the vehicle cleaner unit disclosed in Item (4),
the blowing direction may be directed from an inner side toward an outer side of the vehicle in the left-right direction.

According to this configuration, since the blowing direction of the air blown from the blower is along the traveling wind, blowing can be performed more efficiently.

(6) In the vehicle cleaner unit disclosed in Item (4) or (5),
the blower may be configured to be attached to a rear surface of a front grille of the vehicle, and the front grille may be provided with an air outlet for jetting the air blown from the blower toward the cleaning object.

According to this configuration, since the blower is attached to the rear surface of the front grille, it is possible to save space without impairing the design of the vehicle.

(7) In the vehicle cleaner unit disclosed in any one of Items (1) to (6), the cleaning object may be at least one of a vehicle lamp or an in-vehicle sensor.

Examples of the cleaning object include a vehicle lamp and an in-vehicle sensor. In particular, by jetting the air to the vehicle lamp by the vehicle cleaner unit having the above-described configuration, it is possible to suitably prevent adhesion of foreign substances to the vehicle lamp (in particular, snow accretion).

(8) In order to achieve the above object, a vehicle cleaner unit according to an aspect of the present disclosure is:

a vehicle cleaner unit configured to clean at least one of a vehicle lamp or an in-vehicle sensor as a cleaning object mounted on a vehicle, in which the vehicle cleaner unit is configured with a blower, the at least one of the vehicle lamp or the in-vehicle sensor includes a housing, an outer cover attached to the housing, and a light source disposed in the housing, and the blower is configured to jet air toward a light transmission region that transmits light emitted from the light source in the outer cover.

According to the vehicle cleaner unit of the present disclosure, air is jetted from the blower toward the light transmission region of the outer cover. As a result, it is possible to prevent adhesion of foreign substances (e.g., snow accretion) to the light transmission region, which has a particularly large influence on an illumination function or a sensing function among the entire region of the outer cover.

(9) In order to achieve the above object, a vehicle cleaner unit according to an aspect of the present disclosure is:

a vehicle cleaner unit configured to clean at least one of a vehicle lamp or an in-vehicle sensor as a cleaning object mounted on a vehicle, in which the vehicle cleaner unit is configured with a blower, the at least one of the vehicle lamp or the in-vehicle sensor includes a housing, an outer cover attached to the housing, and a light source disposed in the housing, and the blower is configured to jet air toward a side below a light transmission region that transmits light emitted from the light source in the outer cover.

According to the vehicle cleaner unit of the present disclosure, air is jetted from the blower toward the side below the light transmission region of the outer cover. By removing foreign substances (e.g., snow accretion) below the light transmission region, it is possible to prevent adhesion of the foreign substances to the light transmission region, which has a particularly large influence on the illumination function or the sensing function.

(10) In the vehicle cleaner unit disclosed in Item (9), the cleaning object may include a vehicle lamp and an in-vehicle sensor, the vehicle lamp and the in-vehicle sensor may be housed in the housing, and the blower may be configured to jet air toward a side below a light transmission region of the in-vehicle sensor in the outer cover.

According to this configuration, in a unit in which a vehicle lamp and an in-vehicle sensor are integrated, it is possible to effectively clean the in-vehicle sensor which has a higher necessity to maintain the cleanliness.

(11) In the vehicle cleaner unit disclosed in any one of Items (8) to (10), the blower may be configured to be attached to a bumper of the vehicle, and the bumper may be provided with an air outlet for jetting the air blown from the blower toward the cleaning object along an upper-lower direction of the vehicle.

Since a vehicle lamp or an in-vehicle sensor is often provided near a front bumper or a rear bumper (for example, above the bumper), according to this configuration, it is possible to efficiently blow air to the light transmission region of the outer cover or the side below the light transmission region.

(12) In the vehicle cleaner unit disclosed in any one of Items (8) to (10), the blower may be configured to be attached to a bumper or a grille of the vehicle, and the bumper or the grille may be provided with an air outlet for jetting the air blown from the blower toward the cleaning object along a left-right direction of the vehicle.

Since a vehicle lamp or an in-vehicle sensor is often provided near a bumper or a grille (for example, beside the bumper or grille), according to this configuration, it is possible to efficiently blow air to the light transmission region of the outer cover or the side below the light transmission region.

(13) In order to achieve the above object, a vehicle cleaner unit according to an aspect of the present disclosure is:

a vehicle cleaner unit configured to clean a cleaning object mounted on a vehicle, in which the vehicle cleaner unit is configured with a blower including a main body and a blowout port for jetting air blown from the main body toward the cleaning object, and the vehicle cleaner unit is provided with a closing mechanism configured to close the blowout port when the blower does not operate.

According to the vehicle cleaner unit of the present disclosure, since the blowout port is closed when the blower does not operate, it is possible to effectively prevent water or the like from intruding through the blowout port.

(14) In the vehicle cleaner unit disclosed in Item (13), the closing mechanism may be an open/close cover configured to open and close the blowout port.

According to this configuration, the blowout port can be easily opened and closed.

(15) In the vehicle cleaner unit disclosed in Item (14), the open/close cover may be configured to slide or rotate with respect to the blowout port.

According to this configuration, the blowout port can be easily opened and closed.

(16) In the vehicle cleaner unit disclosed in Item (13), the blower may be configured to be attached to a bumper or a grille of the vehicle, the bumper or the grille may be provided with an air outlet communicating with the blowout port, and the closing mechanism may be an open/close cover configured to open and close the air outlet.

According to this configuration, by opening and closing the air outlet communicating with the blowout port, water can be prevented from intruding into the blowout port.

(17) In the vehicle cleaner unit disclosed in Item (16), the open/close cover may be configured to slide or rotate with respect to the air outlet.

According to this configuration, by opening and closing the air outlet communicating with the blowout port, water can be prevented from intruding into the blowout port.

(18) In the vehicle cleaner unit disclosed in Item (13), the closing mechanism may be a mechanism configured to rotate the main body from a position at which the blower operates to a position at which the blowout port is not exposed to an outside of the vehicle.

According to this configuration, it is possible to close the blowout port without attaching an open/close cover to the blowout port.

(19) In order to achieve the above object, a vehicle cleaner unit according to an aspect of the present disclosure is:

a vehicle cleaner unit configured to clean a cleaning object mounted on a vehicle, in which the vehicle cleaner unit is configured with a blower including a main body and a blowout port for jetting air blown from the main body toward the cleaning object, and a protective cover configured to protect the air from a traveling wind is provided near the blowout port.

According to the vehicle cleaner unit of the present disclosure, it is possible to prevent influence of traveling wind by the protective cover provided near the blowout port.

(20) In the vehicle cleaner unit disclosed in Item (19), the protective cover may include a rectifying wall configured to rectify the air and jetting the air toward the cleaning object.

According to this configuration, it is possible to appropriately control the jetting direction of the air to the cleaning object while preventing the influence of traveling wind.

(21) In the vehicle cleaner unit disclosed in Item (19) or (20), the blower may be configured to be attached to a bumper or a grille of the vehicle, the bumper or the grille may be provided with an air outlet communicating with the blowout port, and the protective cover may be formed in a manner protruding from at least a part of a periphery of the air outlet toward the cleaning object.

According to this configuration, it is possible to easily prevent the influence of traveling wind.

(22) In the vehicle cleaner unit disclosed in any one of Items (1) to (21), the blower may be an air blower configured to continuously blow the air.

According to this configuration, it is possible to continuously jet the air to the cleaning object, and to blow the air in a wide range at a high air volume.

(23) The vehicle cleaner unit disclosed in any one of Items (1) to (22) may further include:

a control unit configured to control an operation of the blower, in which the control unit may be configured to cause the blower to operate based on at least one of a fact that an ambient temperature around the vehicle is equal to or lower than a threshold value or a fact that a wiper of the vehicle is driven.

According to this configuration, it is possible to appropriately operate the vehicle cleaner unit in a situation in which adhesion of snow accretion or mud splash attachment is predicted.

(24) The vehicle cleaner unit disclosed in any one of Items (1) to (22) may further include:

a control unit configured to control an operation of the blower, in which the control unit may be configured to cause the blower to operate constantly when a driving source for traveling of the vehicle is driven.

According to this configuration, by constantly operating the vehicle cleaner unit when the vehicle is driven, it is possible to reliably prevent snow accretion and mud splash attachment.

(25) A vehicle cleaner system according to one aspect disclosed in any one of Items (1) to (7) is:

a vehicle cleaner system including:

the vehicle cleaner unit; and the cleaning object, in which the cleaning object is at least one of a vehicle lamp or an in-vehicle sensor, and an outer cover of the at least one of the vehicle lamp and the in-vehicle sensor is subjected to a water repellent treatment.

(26) A vehicle cleaner system according to one aspect disclosed in any one of Items (8) to (12) is:

a vehicle cleaner system including:

the vehicle cleaner unit; and the at least one of the vehicle lamp and the in-vehicle sensor, in which the outer cover is subjected to a water repellent treatment.

According to this configuration, it is possible to more effectively prevent adhesion of foreign substances (in particular, snow accretion) to the vehicle lamp and the in-vehicle sensor.

(27) In the vehicle cleaner system disclosed in Item (25) or (26), the outer cover may include a base body made of a resin material and a coating layer provided on a surface of the base body, and the coating layer may be made of a resin material containing a water-repellent agent.

The water-repellent outer cover preferably has the above configuration.

(28) In order to achieve the above object, a vehicle cleaner system according to an aspect of the present disclosure is:

a vehicle cleaner system including:

a cleaning object configured to be mounted on a vehicle; and a vehicle cleaner unit configured to clean the cleaning object, in which the cleaning object includes a vehicle lamp, an in-vehicle sensor, a housing in which the vehicle lamp and the in-vehicle sensor are housed, and an outer cover attached to the housing, the vehicle cleaner unit is configured with a blower, and the blower is configured to jet air toward a region corresponding to the on-vehicle sensor or a side below the region in the outer cover.

According to this configuration, in a unit in which a vehicle lamp and an in-vehicle sensor are integrated, it is possible to effectively clean the in-vehicle sensor which has a higher necessity to maintain the cleanliness.

(29) In the vehicle cleaner system disclosed in Item (28), the vehicle lamp, the in-vehicle sensor, and a blowout port of the blower may be arranged in a straight line.

According to this configuration, by adopting an efficient layout of the cleaner unit with respect to the plurality of cleaning objects, cleaning can be performed more effectively.

(30) In the vehicle cleaner system disclosed in Item (29), the in-vehicle sensor may be disposed closer to the blowout port than the vehicle lamp is.

According to this configuration, by bringing the in-vehicle sensor, which is required to have higher cleanliness, closest to the blowout port, it is possible to perform cleaning more effectively.

(31) In the vehicle cleaner system disclosed in Item (28), the in-vehicle sensor may be disposed below the vehicle lamp in the housing.

According to this configuration, by adopting an efficient layout of the cleaner unit with respect to the plurality of cleaning objects, cleaning can be performed more effectively.

Advantageous Effects of Invention

According to the present disclosure, it is possible to provide a vehicle cleaner unit and a vehicle cleaner system that can efficiently and effectively blow air to a cleaning object attached to a vehicle and can be attached in a space-saving manner without impairing a design of the vehicle.

Furthermore, according to the present disclosure, it is possible to provide a vehicle cleaner unit and a vehicle cleaner system capable of preventing intrusion of water or the like.

Furthermore, according to the present disclosure, it is possible to provide a vehicle cleaner unit and a vehicle cleaner system capable of preventing influence of traveling wind.

BRIEF DESCRIPTION OF DRAWINGS

FIG. 9 is a front view of a vehicle cleaner system according to a modification of the fifth embodiment.

FIG. 12 is a cross-sectional view of a vehicle cleaner system according to a seventh embodiment of the present disclosure.

FIG. 15A is a schematic front view of a vehicle cleaner system according to a tenth embodiment of the present disclosure.

DESCRIPTION OF EMBODIMENTS

Figure 1:
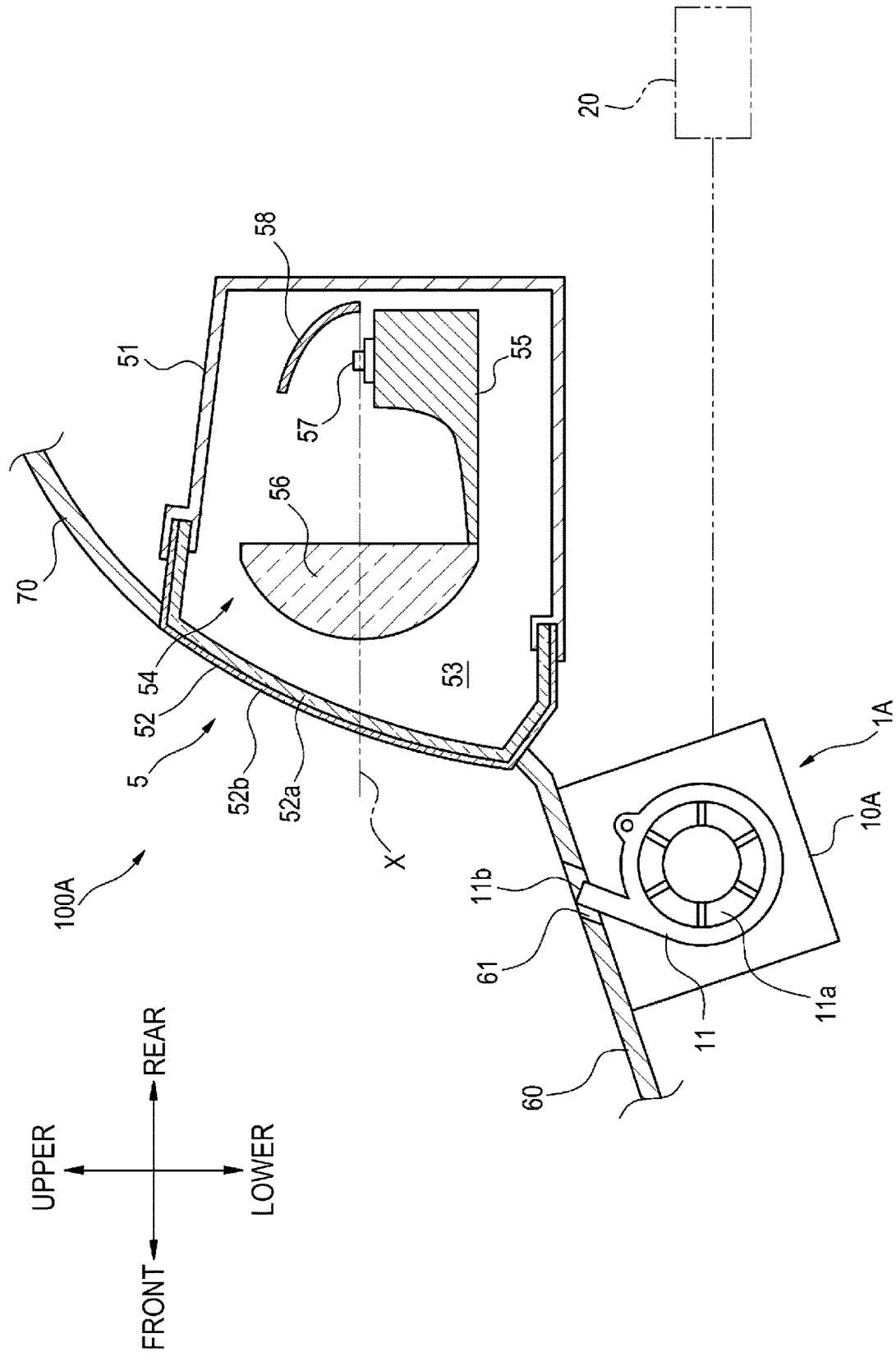
FIG. 1 is a cross-sectional view of a vehicle cleaner system according to a first embodiment of the present disclosure.

Hereinafter, embodiments of the present disclosure will be described with reference to the drawings. A description of members having the same reference numerals as members that have been described in the description of the embodiment will be omitted for convenience of description. Dimensions of members shown in the drawings may be different from actual dimensions of the members for convenience of description.

First Embodiment

FIG. 1 is a vertical cross-sectional view a vehicle cleaner system 100A (hereinafter, also referred to as a cleaner system 100A) according to a first embodiment. As shown in FIG. 1, the cleaner system 100A includes a vehicle cleaner unit 1A (hereinafter, referred to as a cleaner unit 1A) and a headlamp 5 (an example of a cleaning object). The cleaner system 100A is a cleaning system that is mounted on a vehicle to clean a cleaning object such as the headlamp 5. In the description of the present embodiment, a "left-right direction", a "front-rear direction", and an "upper-lower direction" are appropriately described for the convenience of description. Such directions are relative directions set for the vehicle in which the cleaner system 100A is mounted.

The headlamp 5 is mounted near a front bumper 60. For example, the headlamp 5 is mounted in an installation space formed between a bonnet 70 of a vehicle body and the front bumper 60. The headlamp 5 includes a housing 51 having an opening on a front side of the vehicle, and an outer cover 52 attached to cover the housing 51. A lamp chamber 53 is defined between the housing 51 and the outer cover 52. An optical unit 54 is housed in the lamp chamber 53. The optical unit 54 includes a lens holder 55, a lens 56 supported by a front end of the lens holder 55, an LED 57 as a light source supported by a rear end of the lens holder 55, and an elliptical reflector 58 disposed in a rear half portion of the lens holder 55. The light emitted from the LED 57 is reflected by the reflector 58, and is emitted to the front of the vehicle through the lens 56. The optical unit 54 has an optical axis X passing through a center of the lens 56.

The outer cover 52 is made of a transparent resin material. The outer cover 52 is subjected to a water repellent treatment. The outer cover 52 includes a base body 52a and a coating layer 52b provided on a surface of the base body 52a. The coating layer 52b is made of a resin material containing a water-repellent agent.

The base body 52a may be made of a transparent resin material such as polyester, polyolefin, polycarbonate, acrylic resin, polyimide, polystyrene, silicone, epoxy, fluorine resin, polymethylpentene, PET, PVC, or the like.

The coating layer 52b is a layer formed by applying a water-repellent agent onto the base body 52a and then performing drying, curing, or the like. As the water-repellent agent, it is possible to use a silicone-based water-repellent agent, a fluorine-based water-repellent agent, or a combination thereof, and for example, it is preferable mix a silicone-based water-repellent agent with a fluorine-based silane coupling agent and to use the mixture as a fluorine-based water-repellent agent. On a surface of the coating layer 52b, for example, a plurality of convex portions that are distributed in an island form are provided. The "island shape" refers to a state in which the convex portions are not continuously formed but the convex portions are distributed on the surface with a gap provided between the convex portions. Edges of the convex portions are connected to each other by a flat portion having little undulation. In addition, the coating layer 52b may be formed of, for example, a water-repellent film having a fine uneven structure (having a contact angle of 130 degrees or more and a falling angle of 10 degrees or less). The water-repellent film may be attached to the surface of the outer cover 52 (base body 52a) in a replaceable manner.

The cleaner unit 1A includes an air blower 10A (an example of a blower) and a cleaner control unit 20 (an example of a control unit). The cleaner unit 1A is a cleaner for cleaning the headlamp 5.

The air blower 10A is attached to a rear surface (back side) of the front bumper 60. The air blower 10A is an air supply device capable of continuously blowing air. The air blower 10A has a suction port 11a for sucking air and a blowout port 11b for blowing out the air to the outside. The front bumper 60 is provided with an air outlet 61 for jetting air blown out from the air blower 10A toward the outer cover 52 of the headlamp 5. The air blower 10A is attached to the rear surface of the front bumper 60 in an orientation in which the blowout port 11b communicates with the air outlet 61 of the front bumper 60.

The cleaner control unit 20 controls operation of the air blower 10A. The cleaner control unit 20 is electrically connected to the air blower 10A via a signal line.

Figure 2:
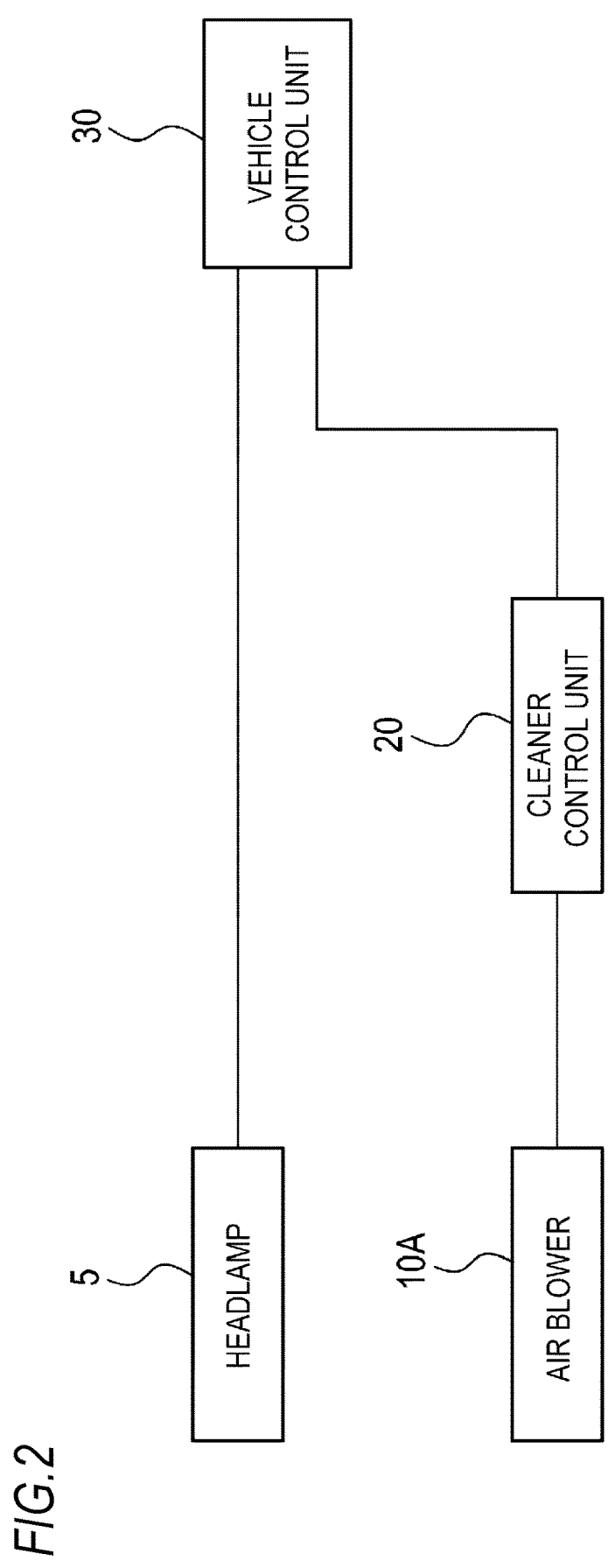
FIG. 2 is a block diagram of the vehicle cleaner system.

FIG. 2 is a block diagram of the cleaner system 100A.

As shown in FIG. 2, the cleaner control unit 20 and the headlamp 5 are connected to a vehicle control unit 30. The cleaner control unit 20 and the headlamp 5 operate based on a control signal output from the vehicle control unit 30.

The vehicle control unit 30 includes, for example, at least one electronic control unit (ECU). The electronic control unit includes a computer system (for example, a system on a chip (SoC)) including one or more processors and one or more memories; and an electronic circuit including an active element such as a transistor and a passive element. The processor includes, for example, at least one of a central processing unit (CPU), a micro processing unit (MPU), a graphics processing unit (GPU) and a tensor processing unit (TPU). The CPU may be configured with a plurality of CPU cores. The GPU may be configured with a plurality of GPU cores. The memory includes a read only memory (ROM) and a random access memory (RAM). The ROM may store a vehicle control program. For example, the vehicle control program may include an artificial intelligence (AI) program for automatic driving. The AI program is a program (a trained model) constructed by supervised or unsupervised machine learning (in particular, deep learning) using a multilayer neural network. The RAM may temporarily store a vehicle control program, vehicle control data, and/or surrounding environment information indicating a surrounding environment of the vehicle. The processor may be configured to load a program designated from various vehicle control programs stored in the ROM onto the RAM and execute various types of processing in cooperation with the RAM. Further, the computer system may be configured with a non-von Neumann computer such as an application specific integrated circuit (ASIC) or a field-programmable gate array (FPGA). Furthermore, the computer system may be configured with a combination of a Von Neumann computer and a non-Von Neumann computer.

The cleaner control unit 20 is controls the air blower 10A. The cleaner control unit 20 includes, for example, at least one ECU. The electronic control unit may include at least one microcontroller including one or more processors and one or more memories, and other electronic circuits including active elements such as transistors and passive elements. The processor is, for example, a CPU, an MPU, and/or a GPU. The CPU may be configured with a plurality of CPU cores. The GPU may be configured with a plurality of GPU cores. The memory includes a ROM and a RAM. The ROM may store a control program for the air blower 10A.

In the present embodiment, the vehicle control unit 30 and the cleaner control unit 20 are provided as separate components, but the vehicle control unit 30 and the cleaner control unit 20 may be integrated. In this regard, the cleaner control unit 20 and the vehicle control unit 30 may be configured with a single electronic control unit.

Figure 3:
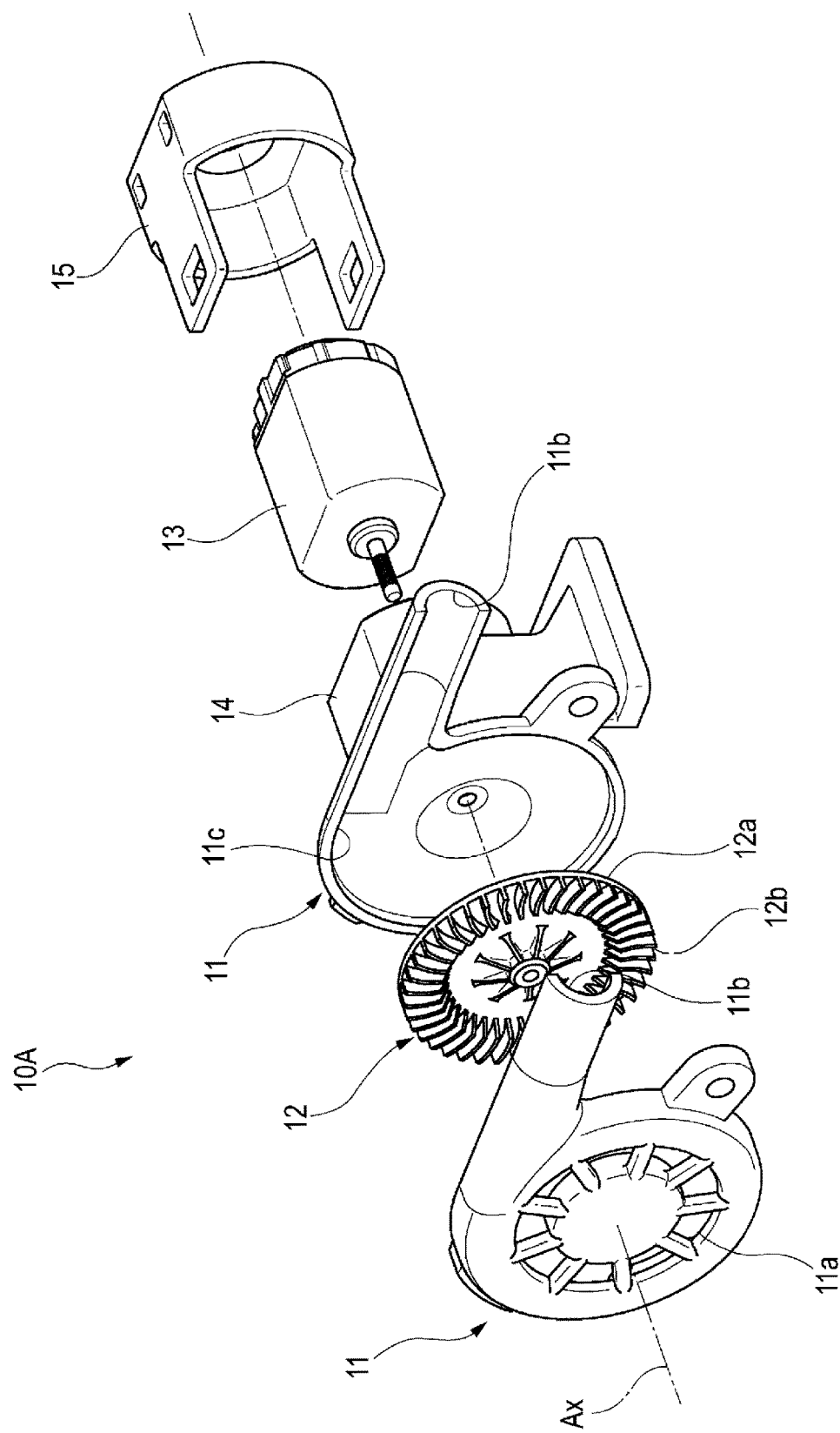
FIG. 3 is an exploded perspective view of a vehicle cleaner unit.

FIG. 3 is an exploded perspective view of the air blower 10A.

As shown in FIG. 3, the air blower 10A includes a main body 11, an impeller 12, a motor 13, a frame 14, and a motor case 15.

The impeller 12 can be rotated about a rotation axis Ax by the motor 13. The impeller 12 includes a disk-shaped plate 12a and a plurality of blades 12b. The plurality of blades 12b extend in a radial direction of the impeller 12. The plurality of blades 12b are disposed so as to form an annular shape on the plate 12a. As the air blower 10A having such a plurality of blades 12b, for example, a Sirocco fan, a turbo fan, a propeller fan, or the like can be employed.

The main body 11 is divided into two so as to sandwich the impeller 12. The main body 11 has a substantially donut-shaped internal space therein. The impeller 12 is housed in the internal space. As described above, the main body 11 has the suction port 11a for sucking the air and the blowout port 11b for blowing the sucked air. The suction port 11a opens in a direction of the rotation axis Ax at a position corresponding to the plurality of blades 12b of the impeller 12. The blowout port 11b opens in a direction intersecting the rotation axis Ax of the impeller 12.

When the impeller 12 rotates, the air sucked from the suction port 11a is pressed against an inner peripheral surface 11c of the main body 11 by the blades 12b. The pressed air is guided along the inner peripheral surface 11c of the main body 11 and guided to the blowout port 11b. The air guided to the blowout port 11b is sent out from the blowout port 11b to the outside of the air blower 10A.

As shown in FIG. 1, the front bumper 60 is provided with an air outlet 61 for jetting air blown out from the air blower 10A toward the headlamp 5. Therefore, the air sent out from the blowout port 11b to the outside of the air blower 10A is jetted toward the outer cover 52 of the headlamp 5 via the air outlet 61 opened in the front bumper 60.

Although not shown in the drawings, the main body 11 may have a drain hole that allows the internal space to communicate with the outside. The drain hole is preferably opened in a bottom of the main body 11 in a state where the air blower 10A is attached to the front bumper 60. The water that intrudes into the main body 11 is discharged to the outside through the drain hole.

For example, when the ambient temperature around the vehicle becomes equal to or lower than a threshold value (equal to or lower than 3° C.), the cleaner control unit 20 outputs a signal for causing the air blower 10A to operate to the air blower 10A. When a wiper of the vehicle is driven, the cleaner control unit 20 may output a signal for causing the air blower 10A to operate to the air blower 10A. When a driving source for driving the vehicle (such as an engine) is driven, the cleaner control unit 20 may output a signal for causing the air blower 10A to operate to the air blower 10A. A signal related to the ambient temperature around the vehicle, a signal related to driving of the wiper, and a signal related to driving of the driving source for traveling are output from the vehicle control unit 30 to the cleaner control unit 20.

As described above, according to the cleaner unit 1A and the cleaner system 100A according to the first embodiment, the air blower 10A is attached to the rear surface of the front bumper 60, and the air outlet 61 for jetting the air blown from the air blower 10A toward the headlamp 5 is opened in the front bumper 60. Accordingly, the air for cleaning the headlamp 5 mounted near the front bumper 60 can be efficiently blown from the air blower 10A to the headlamp 5. Therefore, it is possible to suitably prevent adhesion of foreign substances (in particular, snow accretion) to the headlamp 5. Since the air blower 10A is attached to the rear surface of the front bumper 60 and is not exposed to the outside, the design of the vehicle is not impaired. Further, since the air blower 10A is attached to the rear surface of the front bumper 60, space saving can be realized.

Further, according to the cleaner unit 1A, the air is continuously blown toward the headlamp 5 by the air blower 10A, so that a layer of air (air curtain) flowing on the outer cover 52 of the headlamp 5 is formed. As a result, dirt, rain, snow, or the like is flushed to the outside by the air curtain before adhering to the headlamp 5, and dirt, rain, snow, and the like are less likely to be attached to the headlamp 5 in the first place. Further, since the air is continuously blown to the headlamp 5 by the air blower 10A, the dirt or the like is immediately removed even if adhered to the headlamp 5. Further, by using the air blower 10A, it is possible to blow the air in a wide range of the outer cover 52 of the headlamp 5 at a high air flow rate.

Further, according to the cleaner unit 1A, the cleaner control unit 20 is configured to cause the air blower 10A to operate at least one of when the ambient temperature around the vehicle is equal to or lower than the threshold value or the time when the wiper of the vehicle is driven. Therefore, it is possible to appropriately operate the air blower 10A in a situation in which adhesion of snow accretion or mud splash attachment is predicted.

Further, according to the cleaner unit 1A, the cleaner control unit 20 may be configured to constantly cause the air blower 10A to operate when the vehicle is driven. In this way, by constantly causing the air blower 10A to operate when the vehicle is driven, it is possible to reliably prevent adhesion of snow accretion and mud splash.

Further, the cleaner system 100A includes the cleaner unit 1A and the headlamp 5 (an example of a cleaning object), and the outer cover 52 of the headlamp 5 is provided with the water-repellent coating layer 52b. Therefore, it is possible to more effectively prevent adhesion of foreign substances (in particular, snow accretion) to the cleaning object.

In the above embodiment, the headlamp 5 has been described as an example of the cleaning object, but the present invention is not limited thereto. For example, the cleaning object may be a vehicle lamp different from the headlamp 5, such as a rear combination lamp, a position lamp, and a turn signal lamp. In addition, the cleaning object may be an in-vehicle sensor such as a camera, a LiDAR, a radar, or the like mounted on the vehicle, or a cover covering such an in-vehicle sensor. The camera is, for example, a camera including an image pickup element such as a charge-coupled device (CCD) or a complementary MOS (CMOS). The camera is a camera that detects visible light or an infrared camera that detects infrared rays. The LiDAR is an abbreviation for light detection and ranging or laser imaging detection and ranging. The radar is a millimeter-wave radar, a microwave radar, a laser radar, and the like.

In the above embodiment, the case where the air blower 10A is attached to the rear surface of the front bumper 60 has been described, but the present invention is not limited thereto. For example, the air blower 10A may be attached to a rear surface (back side) of a front grille near the headlamp 5. In this case, the air outlet 61 opened in the front bumper 60 in FIG. 1 is provided in the front grille, which is a design component attached with the air blower 10A. When the cleaning object is a rear combination lamp or an in-vehicle sensor attached to the rear of the vehicle, the air blower 10A may be attached to the rear surface of a rear bumper of the vehicle. In this case, the air outlet 61 opened in the front bumper 60 in FIG. 1 is provided in the rear bumper, which is a design component attached with the air blower 10A.

In the above embodiment, an air blower 10A that continuously blows the air has been described, but the present invention is not limited thereto. For example, a piston type blower that intermittently blows air may be used.

Second Embodiment

Figure 4:
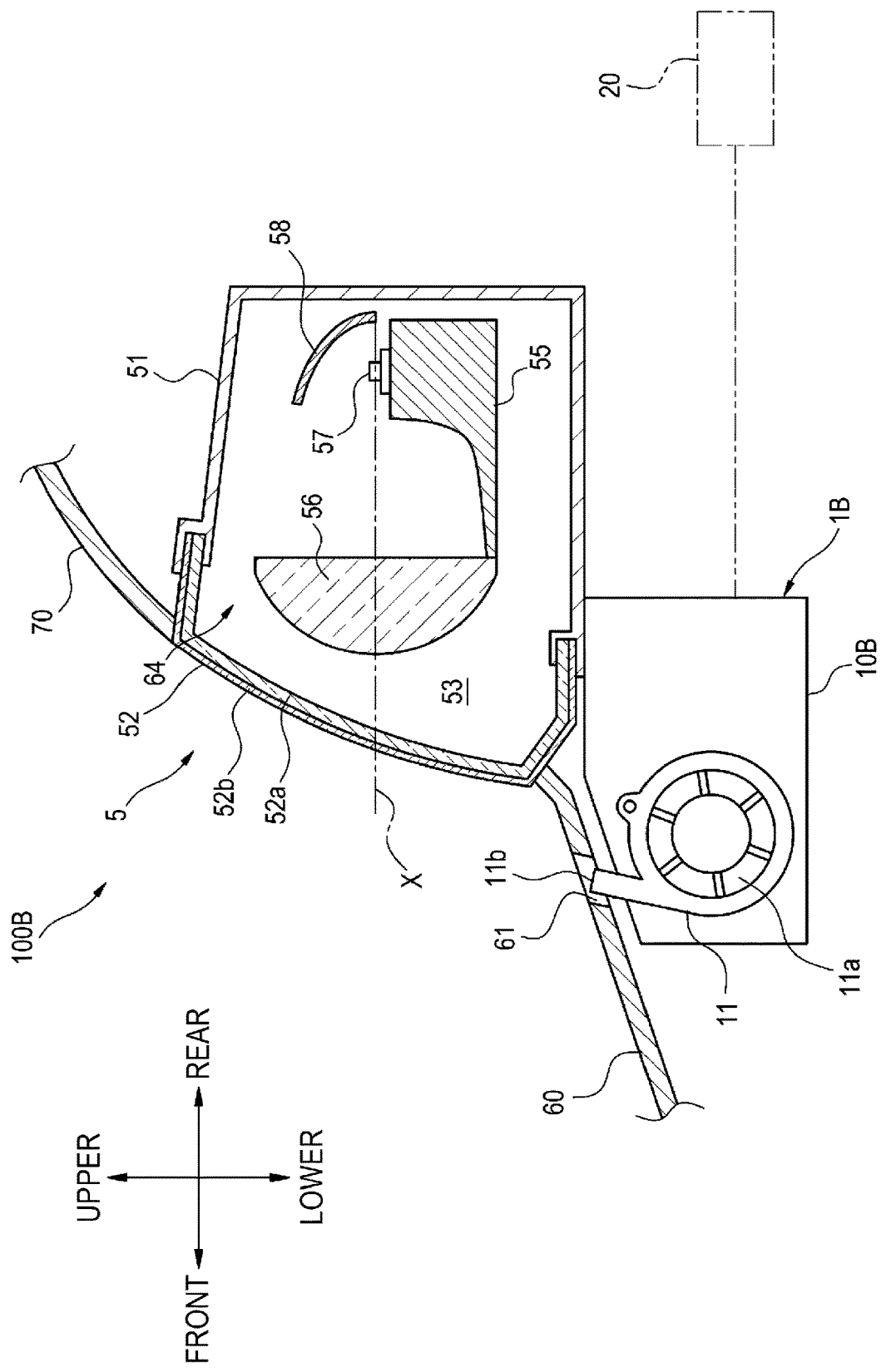
FIG. 4 is a cross-sectional view of a vehicle cleaner system according to a second embodiment of the present disclosure.

FIG. 4 is a vertical cross-sectional view of a cleaner system 100B according to a second embodiment. The cleaner system 100B and a cleaner unit 1B according to the second embodiment differ in that the air blower 10B is attached to the housing 51 of the headlamp 5 from the cleaner system 100A and the cleaner unit 1A according to the first embodiment, in which the air blower 10A is attached to the rear surface of the front bumper 60. The function of the air blower 10B is the same as the function of the air blower 10A described in the first embodiment. Further, similarly to the first embodiment, the front bumper 60 is opened with an air outlet 61 for jetting air blown out from the air blower 10B toward the headlamp 5.

As described above, according to the cleaner unit 1B according to the second embodiment, the air blower 10B is attached to the housing 51 of the headlamp 5, and the air outlet 61 is open in the front bumper 60. Therefore, air can be efficiently blown from the air blower 10B to the outer cover 52 of the headlamp 5. Since the air blower 10B is attached to the housing 51 of the headlamp 5 and is not exposed to the outside, the design of the vehicle is not impaired. Further, since the air blower 10B is integrally attached to the housing 51 of the headlamp 5, it is possible to save space and appropriately set the blowing direction of the air jetted to the outer cover 52 of the headlamp 5.

FIG. 4 shows an example in which the air blower 10B is attached to the headlamp 5, whereas the air blower 10B may be attached to a housing of another cleaning object. For example, the air blower 10B may be attached to another vehicle lamp such as a rear combination lamp, a position lamp, and a turn signal lamp. The air blower 10B may be attached to an in-vehicle sensor such as a camera, a LiDAR, and a radar. In this case, the air outlet 61 opened in the front bumper 60 in FIG. 4 is appropriately provided in a predetermined design component (for example, a rear bumper, a front grille, or the like) in accordance with the position of the cleaning object attached with the air blower 10B.

Third Embodiment

Figure 5:
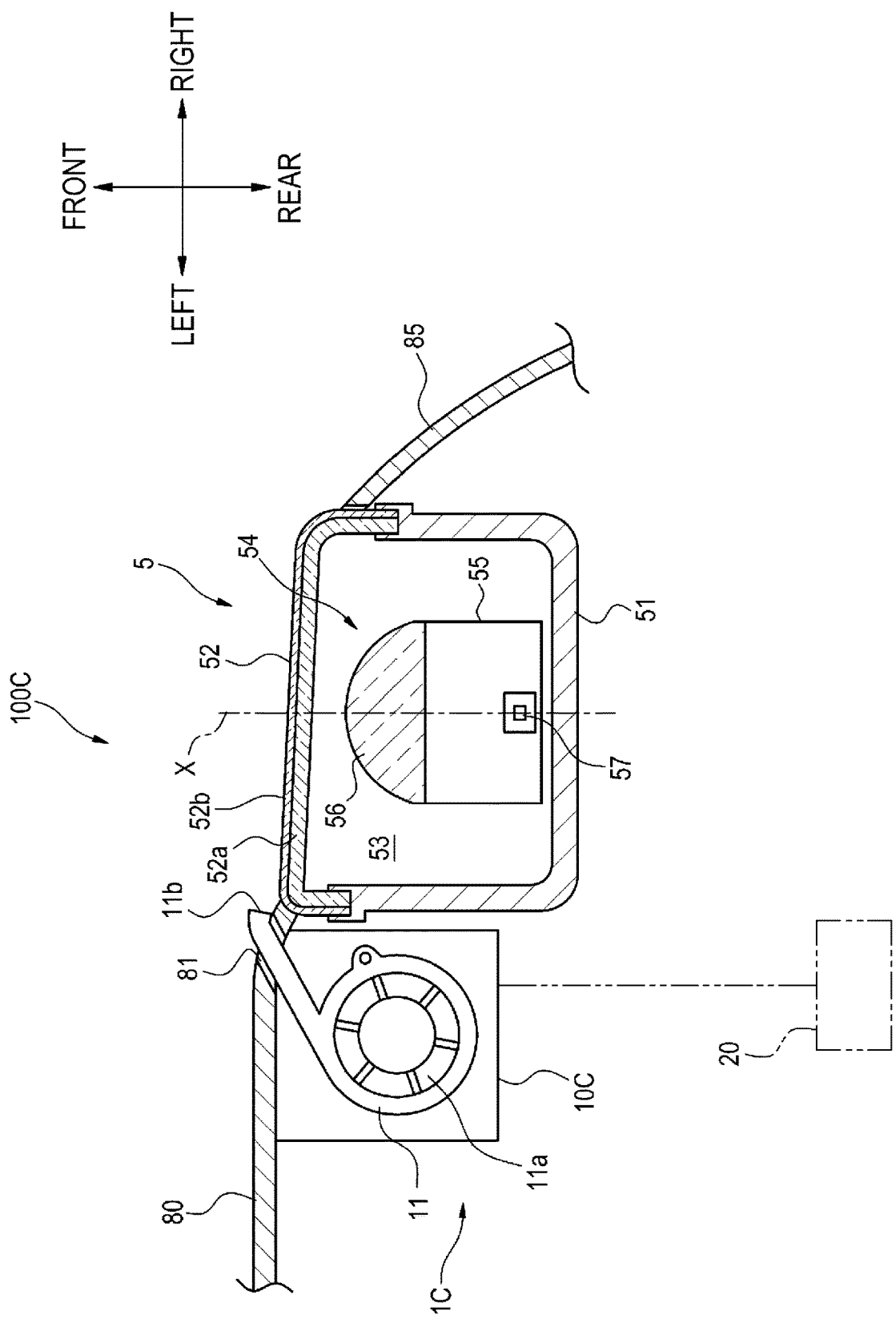
FIG. 5 is a cross-sectional view of a vehicle cleaner system according to a third embodiment of the present disclosure.

FIG. 5 is a horizontal cross-sectional view of a cleaner system 100C according to a third embodiment.

As shown in FIG. 5, the cleaner system 100C according to the third embodiment is provided with a cleaner unit 1C and the headlamp 5. The cleaner unit 1C includes an air blower 10C and the cleaner control unit 20.

The air blower 10C is attached to a side portion of the headlamp 5 on a rear surface (back side) of a front grille 80 disposed between the left and right headlamps 5. The headlamp 5 shown in FIG. 5 is a headlamp 5 mounted on the side of the vehicle, and is disposed between the front grille 80 and the vehicle body panel 85 on a lateral side of the vehicle in a top view. Therefore, the air blower 10C is disposed on the rear surface of the front grille 80 and on the left side of the right headlamp 5. Although not shown, with respect to the left headlamp, the air blower 10C may be disposed on the rear surface of the front grille 80 and on the right side of the left headlamp.

The front grille 80 is provided with an air outlet 81 for jetting air blown out from the air blower 10C toward the headlamp 5. The air blower 10C is attached to the rear surface of the front grille 80 in an orientation in which the blowout port 11b of the air blower 10C communicates with the air outlet 81 of the front grille 80. The air jetted from the blowout port 11b of the air blower 10C toward the headlamp 5 is sent out from the inner side to the outer side in the left-right direction of the vehicle along a streamlined shape of the vehicle body at the front portion of the vehicle. In the case of the headlamp 5 on the right side, the blowing direction of the air jetted from the blowout port 11b of the air blower 10C is sent out from the left side to the right side in the left-right direction of the vehicle. The function of the air blower 10C is the same as the function of the air blower 10A described in the first embodiment.

As described above, the cleaner unit 1C according to the third embodiment is configured such that the air jetted from the air blower 10 toward the headlamp 5 is sent out along the left-right direction of the vehicle. Therefore, for example, when the air blower 10C is disposed on either the left or right side of the headlamp 5 when there is a space on both left and right sides of the headlamp 5, air for cleaning the headlamp 5 can be efficiently blown from the air blower 10C to the headlamp 5.

Further, by disposing the air blower 10C inside the headlamp 5 in the left-right direction of the vehicle, the blowing direction of the air jetted from the air blower 10C can be a direction along the traveling wind, that is, a direction from the inner side to the outer side of the vehicle. Accordingly, air can be further efficiently blown from the air blower 10C to the headlamp 5.

According to the cleaner unit 1C, the air blower 10C is attached to the rear surface of the front grille 80, and the air outlet 81 for jetting the air blown from the air blower 10C toward the headlamp 5 is opened in the front grille 80. As a result, since the air blower 10C is hidden behind the front grille 80 and is not exposed to the outside, the design of the vehicle is not impaired. Further, since the air blower 10C is attached to the rear surface of the front grille 80, space saving can be realized.

Although the air blower 10C is attached to the rear surface of the front grille 80 in FIG. 5, the present invention is not limited to this example. As long as the air blower 10C is disposed on either the left or right side of the headlamp 5, the air blower 10C may be attached to, for example, the rear surface of the front bumper. In this case, the air outlet 81 opened in the front grille 80 in FIG. 5 is provided in the front bumper attached with the air blower 10C.

Further, in FIG. 5, the air blower 10C is disposed on the inner side of the headlamp 5 (the left side of the right headlamp 5 in the case of the right headlamp 5), but the air blower 10C may also be disposed on the outer side of the headlamp 5, for example. In this case, the blowing direction of the air jetted from the blowout port 11b of the air blower 10C toward the headlamp 5 is from the outer side to the inner side in the left-right direction of the vehicle.

Further, similarly to the air blower 10B illustrated in FIG. 4, the air blower 10C may be attached to the housing 51 of the headlamp 5 instead of the front grille 80.

The cleaning object to which air is blown by the air blower 10C is not limited to the headlamp 5, and may be a position lamp and a turn signal lamp, or may be an in-vehicle sensor such as a camera, a LiDAR, and a radar.

Fourth Embodiment

Figure 6:
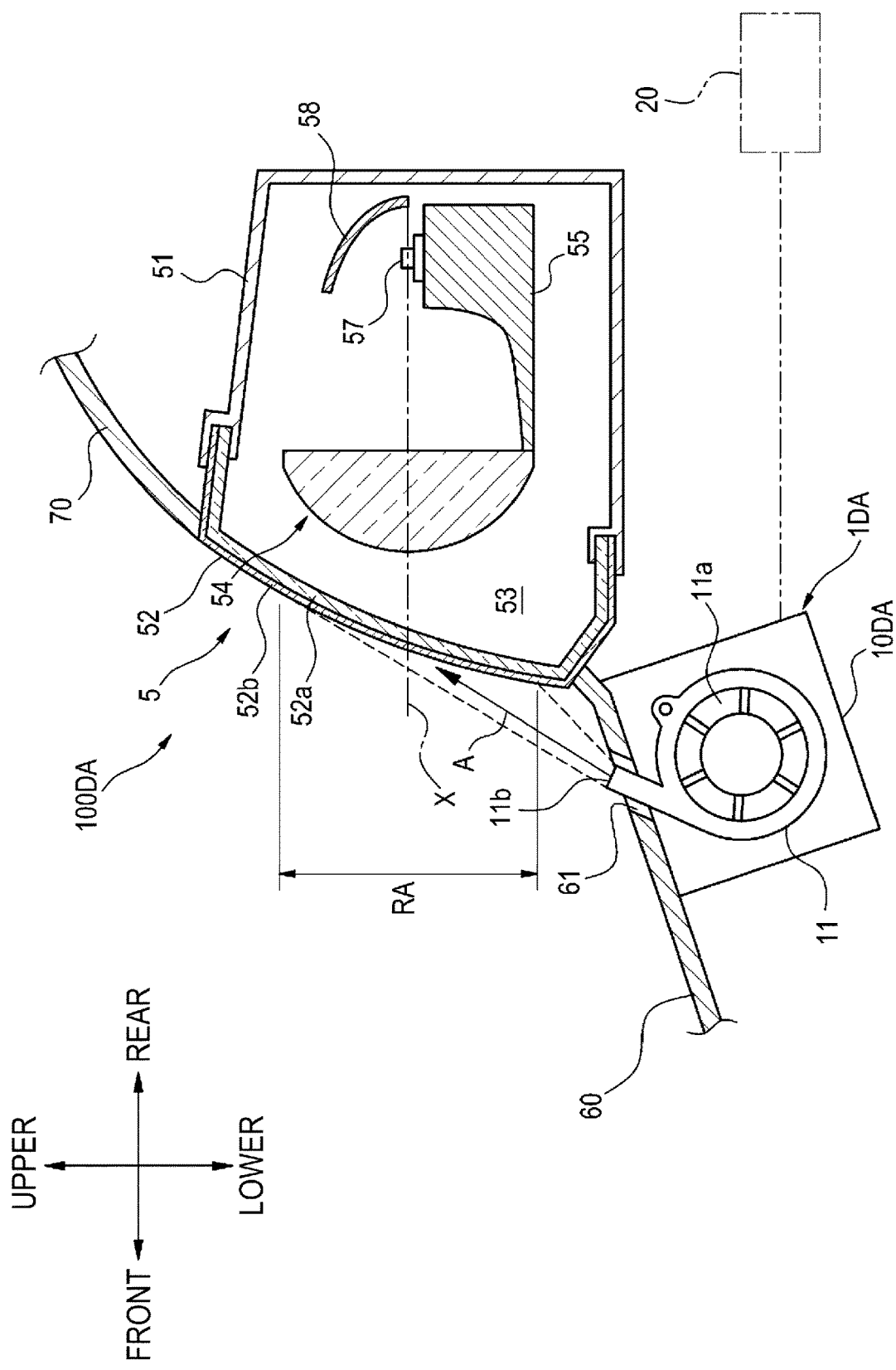
FIG. 6 is a cross-sectional view of a vehicle cleaner system according to a fourth embodiment of the present disclosure.

FIG. 6 is a cross-sectional view of a cleaner system 100DA according to a fourth embodiment.

As shown in FIG. 6, the cleaner system 100DA according to the fourth embodiment includes a cleaner unit 1DA and the headlamp 5. The cleaner unit 1DA includes an air blower 10DA and the cleaner control unit 20. The function of the air blower 10DA is the same as the function of the air blower 10A described in the first embodiment.

The air blower 10DA shown in FIG. 6 is attached to the front bumper 60 below the headlamp 5. The front bumper 60 is provided with the air outlet 61 for jetting the air blown from the air blower 10DA toward the headlamp 5 along the upper-lower direction of the vehicle. The air blower 10DA is attached to the rear surface of the front bumper 60 in an orientation in which the blowout port 11b of the air blower 10DA communicates with the air outlet 61 of the front bumper 60.

The air blower 10DA is configured to jet the air toward the light transmission region of the outer cover 52 of the headlamp 5. Here, the "light transmission region" means a region in which a transmitted light amount is relatively large in the front surface region of the outer cover 52, which transmits the light emitted from the light source 57. For example, the light transmission region is a predetermined region centered on a point at which the optical axis X of the optical unit 54 housed in the headlamp 5 intersects with the outer cover 52.

For example, in the air blower 10DA of FIG. 6, the air blown from the air blower 10DA is jetted upward as indicated by an arrow A toward a point at which the optical axis X of the optical unit 54 and the outer cover 52 intersect each other. In this way, the air blower 10DA jets the air toward a light transmission region RA (see FIG. 6) of the outer cover 52 of the headlamp 5.

Figure 7:
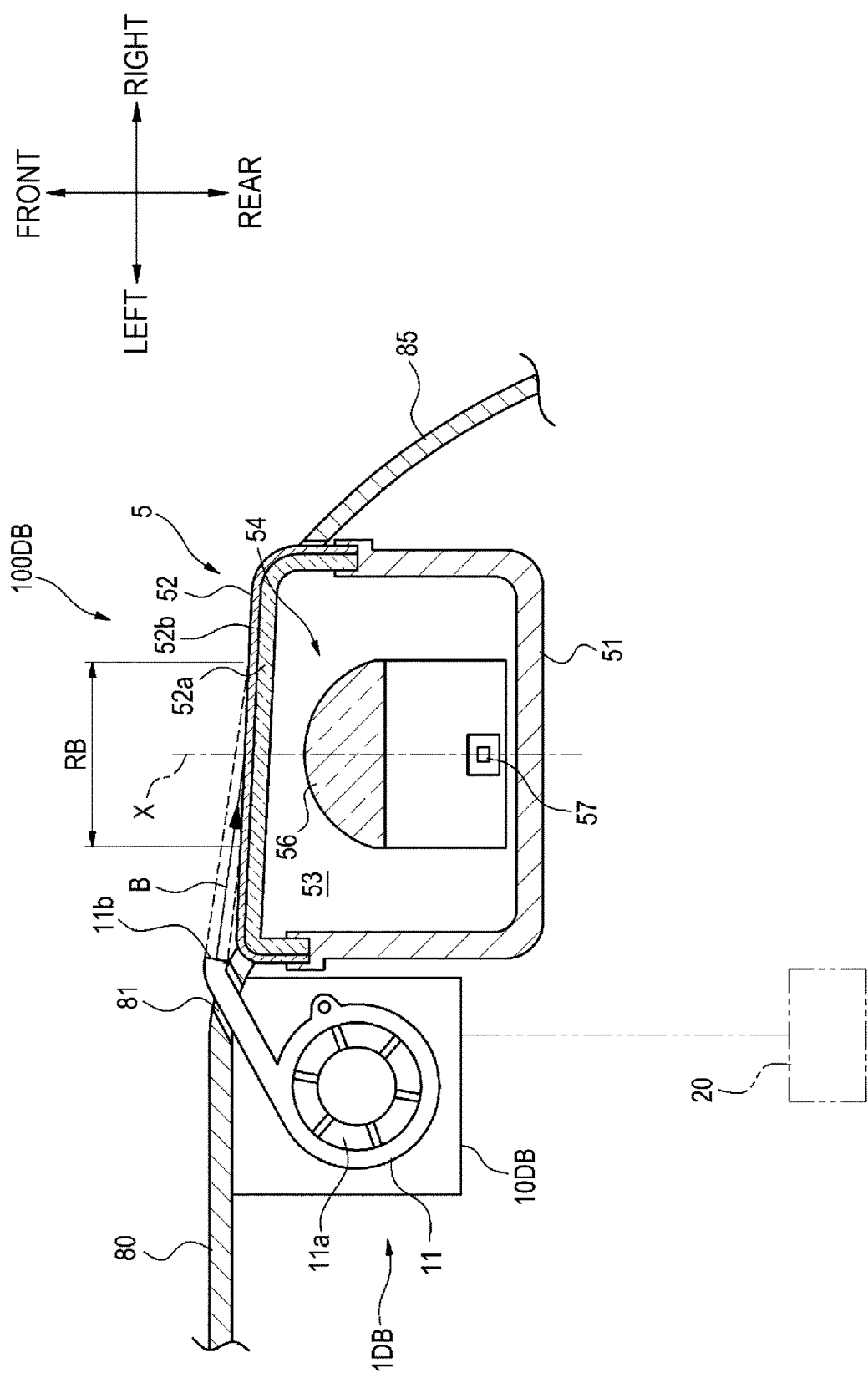
FIG. 7 is a cross-sectional view of a vehicle cleaner system according to a modification of the fourth embodiment.

FIG. 7 is a cross-sectional view of a cleaner system 100DB according to a modification of the fourth embodiment.

As shown in FIG. 7, a cleaner system 100DB according to the present modification includes a cleaner unit 1DB and the headlamp 5. The cleaner unit 1DB includes an air blower 10DB and the cleaner control unit 20.

The air blower 10DB shown in FIG. 7 is attached to the front grille 80 disposed on the left side of the right headlamp 5. The front grille 80 is provided with the air outlet 81 for jetting the air blown from the air blower 10DB toward the headlamp 5 along the left-right direction of the vehicle. The air blower 10DB is attached to the rear surface of the front grille 80 such that the blowout port 11b of the air blower 10DB communicates with the air outlet 81 of the front grille 80.

Similar to the air blower 10DA, the air blower 10DB according to the present modification is configured to jet the air toward a light transmission region RB (see FIG. 7) of the outer cover 52 of the headlamp 5. That is, in the air blower 10DB, the air blown from the air blower 10DB is jetted rightward as indicated by an arrow B toward a point at which the optical axis X of the optical unit 54 and the outer cover 52 intersect each other.

As described above, according to the cleaner unit 1DA, 1DB, and the cleaner system 100DA, 100DB according to the fourth embodiment, the air blower 10DA, 10DB is configured to jet the air toward the light transmission region RA, RB of the outer cover 52 of the headlamp 5. As a result, it is possible to prevent adhesion of foreign substances such as snow accretion to the light transmission region, which has a particularly large influence on the illumination function (the sensing function in the case of in-vehicle sensor) among the entire region of the outer cover 52.

With respect to a vehicle lamp or in-vehicle sensor provided above or below the front bumper, the air is jetted from the air blower 10DA along the upper-lower direction of the vehicle as shown in FIG. 6, so that the air can be efficiently blown to the light transmission region RA.

With respect to a vehicle lamp or in-vehicle sensor provided on a lateral side of the bumper or grille, the air is jetted from the air blower 10DB along the left-right direction of the vehicle as shown in FIG. 7, so that the air can be efficiently blown to the light transmission region RB.

Although the air blower 10DA is attached to the front bumper 60 in FIG. 6, the air blower 10DA may be attached to the rear bumper, for example. In this case, the air outlet for jetting the air along the upper-lower direction of the vehicle is provided on the rear bumper. Further, for example, the air blower 10DA may be attached to the headlamp 5. In this case, the air outlet for jetting the air along the upper-lower direction of the vehicle is appropriately provided on a predetermined design component (for example, the front grille, the front bumper, or the like) in accordance with the position where the headlamp 5 is mounted.

Although the air blower 10DB is attached to the front grille 80 in FIG. 7, the air blower 10DB may be attached to the front bumper or the rear bumper, for example. In this case, the air outlet for jetting the air along the left-right direction of the vehicle is provided on the front bumper or the rear bumper. Further, for example, the air blower 10DB may be attached to the headlamp 5. In this case, the air outlet for jetting the air along the left-right direction of the vehicle is appropriately provided on a predetermined design component (for example, the front grille, the front bumper, or the like) in accordance with the position where the headlamp 5 is mounted.

The cleaning object may be a vehicle lamp such as a position lamp, a turn signal lamp, and a rear combination lamp, or may be an in-vehicle sensor such as a camera, a LiDAR, and a radar.

Fifth Embodiment

Figure 8:
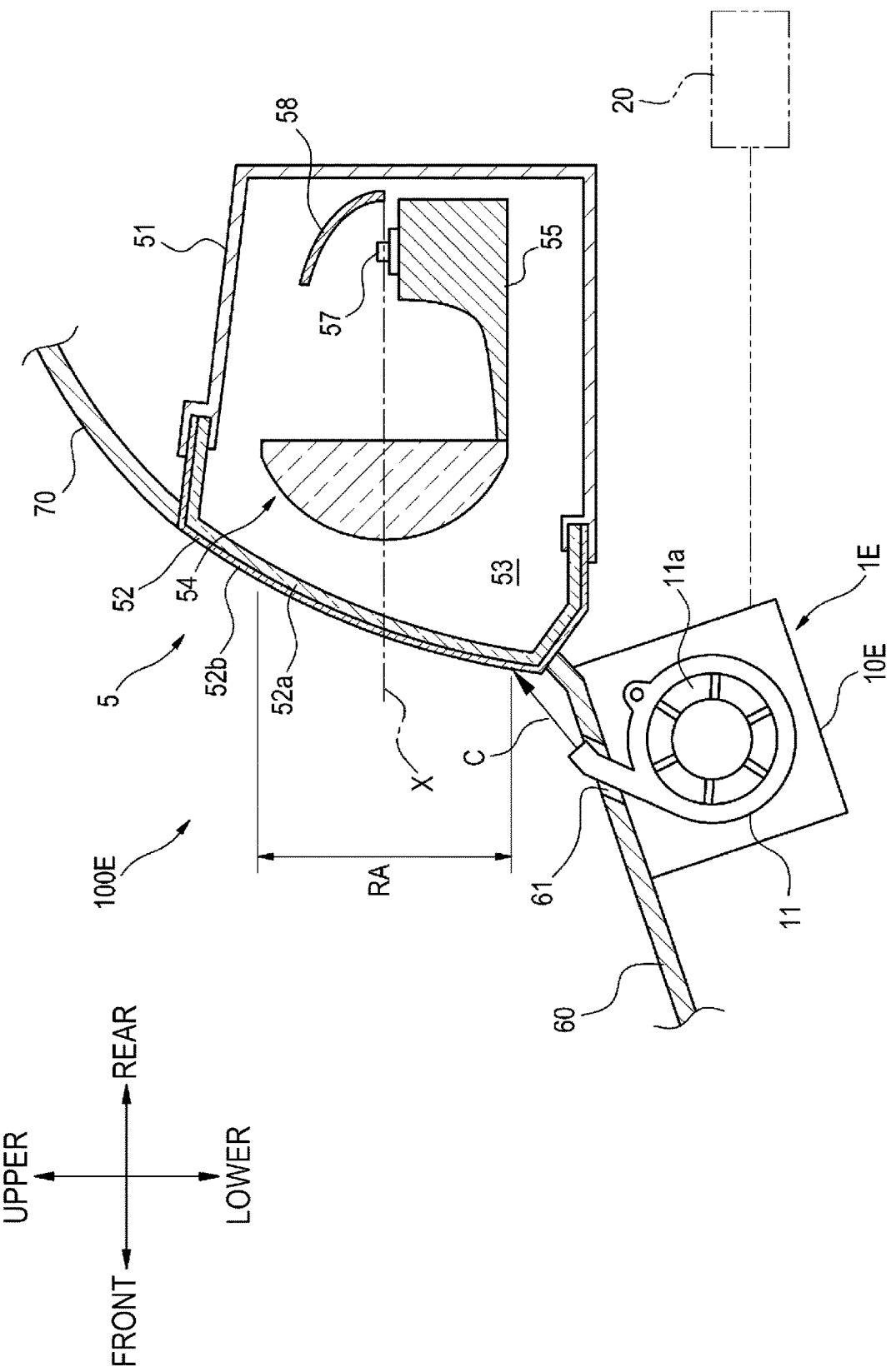
FIG. 8 is a cross-sectional view of a vehicle cleaner system according to a fifth embodiment of the present disclosure.

FIG. 8 is a vertical cross-sectional view of a cleaner system 100E according to a fifth embodiment. The cleaner system 100E and a cleaner unit 1E according to the fifth embodiment differ in that the air blower 10E is configured to jet the air toward a side below the light transmission region RA in the outer cover 52 of the headlamp 5, from the cleaner system 100DA and the cleaner unit 1DA according to the fourth embodiment described above (see FIG. 6), which are configured to jet the air toward the light transmission region RA of the outer cover 52. Other configurations are the same as those of the cleaner system 100DA and the cleaner unit 1DA.

As illustrated in FIG. 8, the air blown from the air blower 10E is jetted in a direction as indicated by an arrow C toward the side below the light transmission region RA including the point at which the optical axis X of the optical unit 54 and the outer cover 52 intersect each other.

As shown in FIG. 9, in a case where the air blower is attached to the front grille 80, that is, in a case where the air blower is provided on the lateral side of the headlamp 5, the configuration is the same as the case of FIG. 7 in the fourth embodiment except that the blowout port 11b of the air blower jets the air toward the side below the light transmission region RB (the region corresponding to the lens 56) in the outer cover 52 of the headlamp 5.

As described above, according to the cleaner unit 1E and the cleaner system 100E according to the fifth embodiment, the air blower 10E is configured to jet the air toward the side below the light transmission region RA of the outer cover 52 of the headlamp 5. Thereby, the snow accretion or the like can be removed from the side below the light transmission region RA in which the snow accretion or the like tends to accumulate. As a result, it is possible to prevent snow accretion in the light transmission region, which has a particularly large influence on the illumination function of the headlamp 5 (the sensing function in the case of in-vehicle sensor).

Sixth Embodiment

Figure 10:
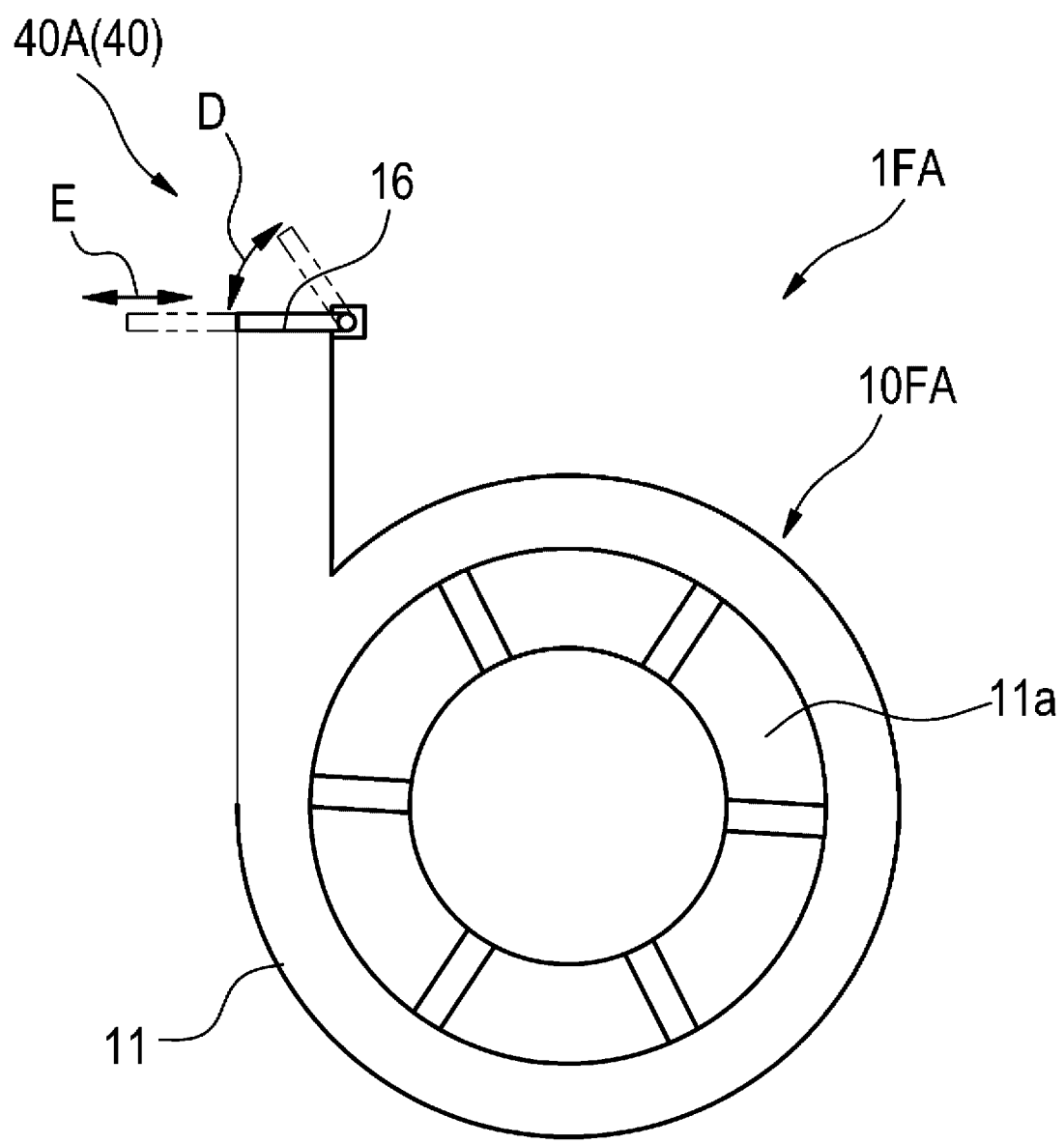
FIG. 10 is a view of a vehicle cleaner unit according to a sixth embodiment of the present disclosure.

FIG. 10 is a diagram illustrating a cleaner unit 1FA according to a sixth embodiment.

As illustrated in FIG. 10, the cleaner unit 1FA according to the sixth embodiment includes an air blower 10FA, a closing mechanism 40, and the cleaner control unit 20 (not illustrated). The air blower 10FA includes the main body 11 and the blowout port 16 for jetting air blown from the main body toward the cleaning object. The closing mechanism 40 is configured to close the blowout port 16 when the air blower 10FA does not operate. The closing mechanism 40 is connected to the cleaner control unit 20 and operates based on a control signal output from the cleaner control unit 20.

In the cleaner unit 1FA shown in FIG. 10, the closing mechanism 40 is configured with an open/close cover 40A. The open/close cover 40A is provided at the blowout port 16 of the air blower 10FA, and is rotatable with respect to the blowout port 16 as indicated by an arrow D. The open/close cover 40A is capable of opening and closing the blowout port 16 by rotating with respect to the blowout port 16.

As indicated by an arrow E, the open/close cover 40A may be slidable with respect to the blowout port 16. In this case, the open/close cover 40A can open and close the blow-out port 16 by sliding with respect to the blow-out port 16.

In a case where the air blower 10FA is attached to the bumper, the grille, or the cleaning object (for example, in a case where the air blower 10FA is attached as shown in FIG. 1, 4, or 5), an opening (for example, the air outlet 61 shown in FIG. 1) of the bumper or the like provided so as to communicate with the blowout port 16 of the air blower 10FA may be opened and closed by the open/close cover 40A.

Figure 11:
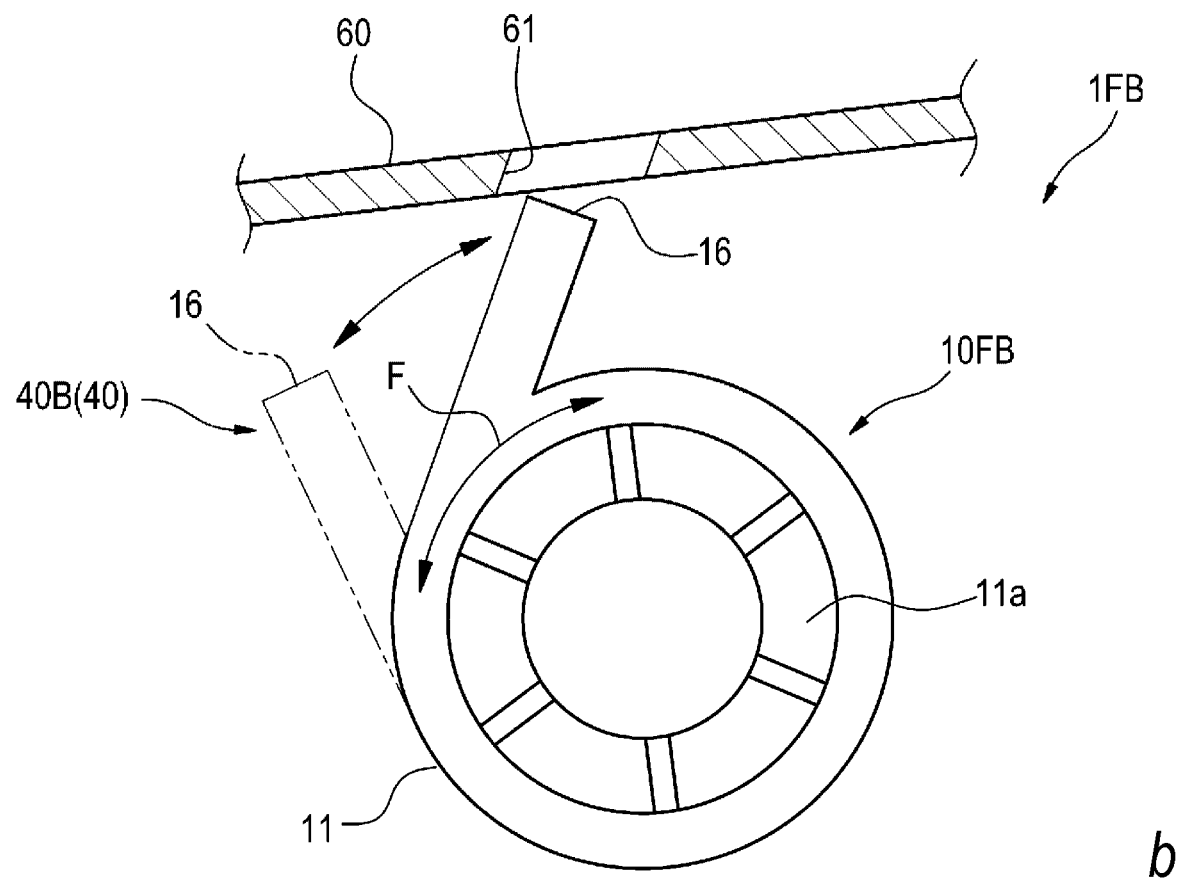
FIG. 11 is a view of a vehicle cleaner unit according to a modification of the sixth embodiment.

FIG. 11 is a diagram illustrating a cleaner unit 1FB according to a modification of the sixth embodiment.

As shown in FIG. 11, in the cleaner unit 1FB according to the present modification, the closing mechanism 40 is configured with a rotation mechanism 40B. The rotation mechanism 40B is configured to rotate the main body 11 of the air blower 10FB in a direction indicated by an arrow F. The air blower 10FB is rotatable with respect to a member to which the air blower 10FB is attached (for example, the bumper, the grille, or the cleaning object). The air blower 10FB shown in FIG. 11 is attached to the front bumper 60.

The rotation mechanism 40B is capable of opening and closing the blowout port 16 of the air blower 10FB by rotating the main body 11 of the air blower 10FB to a position indicated by a solid line and a position indicated by a broken line. That is, by rotating the air blower 10FB, the rotation mechanism 40B can expose the blowout port 16 of the air blower 10FB to the outside of the vehicle through the air outlet 61 of the front bumper 60 when the air blower 10FB operates, and prevent the blowout port 16 from being exposed to the outside of the vehicle when the air blower 10FB is stopped.

As described above, the cleaner unit 1FA, 1FB according to the sixth embodiment is configured such that the blowout port 16 is closed by the closing mechanism 40 when the air blower 10FA, 10FB does not operate. Therefore, it is possible to effectively prevent water or the like from entering the air blower 10FA, 10FB from the blowout port 16.

According to the cleaner unit 1FA, 1FB, by using the open/close cover 40A as the closing mechanism 40, it is possible to easily open and close the blowout port 16 of the air blower 10FA. In addition, by opening and closing the air outlet of the bumper of the like communicating with the blowout port 16 of the air blower 10FA, water can be prevented from intruding into the blowout port 16. Further, by using the rotation mechanism 40B as the closing mechanism 40, the blowout port 16 can be closed without attaching the open/close cover to the blowout port 16 of the air blower 10FB.

In the modification, a configuration is adopted in which the air blower 10FB is rotated by using the rotation mechanism 40B as the closing mechanism 40 to close the blowout port 16, but the present invention is not limited to this example. For example, a sliding mechanism that slides the air blower 10FB in the lateral direction may be employed as the closing mechanism 40, and the blowout port 16 may be closed by sliding the air blower 10FB in the horizontal direction.

Seventh Embodiment

FIG. 12 is a vertical cross-sectional view of a cleaner system 100G according to a seventh embodiment.

As shown in FIG. 12, the cleaner system 100G according to the seventh embodiment is provided with a cleaner unit 1G and the headlamp 5. The cleaner unit 1G includes an air blower 10G, a protective cover 90, and the cleaner control unit 20.

The protective cover 90 is configured to protect the air jetted from the blowout port 11b of the air blower 10G from influence of the traveling wind of the vehicle. The protective cover 90 is provided near the blowout port 11b of the air blower 10G.

The air blower 10G shown in FIG. 12 is attached to the front bumper 60. The front bumper 60 is provided with the air outlet 61 which allows the air jetted from the blowout port 11b of the air blower 10G to pass. The air outlet 61 of the front bumper 60 is open to communicate with the blowout port 11b of the air blower 10G. The protective cover 90 is a protruding member that is formed integrally with the front bumper 60 and protrudes from the front bumper 60. The protective cover 90 protrudes from a part of a periphery of the air outlet 61 opened in the front bumper 60 toward the headlamp 5 along an orientation of the blowout port 11b of the air blower 10G. An inner wall of the protective cover 90 (a wall facing the blowout port 11b of the air blower 10G) is configured as a rectifying wall 91 for rectifying the air jetted from the blowout port 11b and blowing the air to the headlamp 5. The rectifying wall 91 is formed as, for example, a semicircular wall that is continuous along the orientation of the blowout port 11b.

As described above, according to the cleaner unit 1G and the cleaner system 100G according to the seventh embodiment, the protective cover 90 is provided near the blowout port 11b of the air blower 10G. Therefore, it is possible to prevent the influence of the traveling wind of the vehicle on the air jetted from the blowout port 11b. That is, the air blown from the air blower 10G can be jetted in an appropriate direction without being affected by the traveling wind.

The protective cover 90 is formed to protrude from a part of the periphery of the air outlet 61 of the front bumper 60 opened toward the headlamp 5 to communicate with the blowout port 11b of the air blower 10G. Therefore, it is possible to reliably protect the air jetted from the blowout port 11b, and to easily prevent the influence of the traveling wind.

The protective cover 90 is provided with the rectifying wall 91 for rectifying the air jetted from the blowout port 11b and blowing the air to the headlamp 5. Therefore, it is possible to appropriately control the jetting direction of the air to the headlamp 5 while preventing the influence of traveling wind.

The air blower 10G may be attached to, for example, the front grille 80 (see FIG. 5). In this case, the protective cover 90 may be provided to protrude from a part of the periphery of the air outlet 81 opened in the front grille 80 toward the headlamp 5.

Eighth Embodiment

Figure 13A:
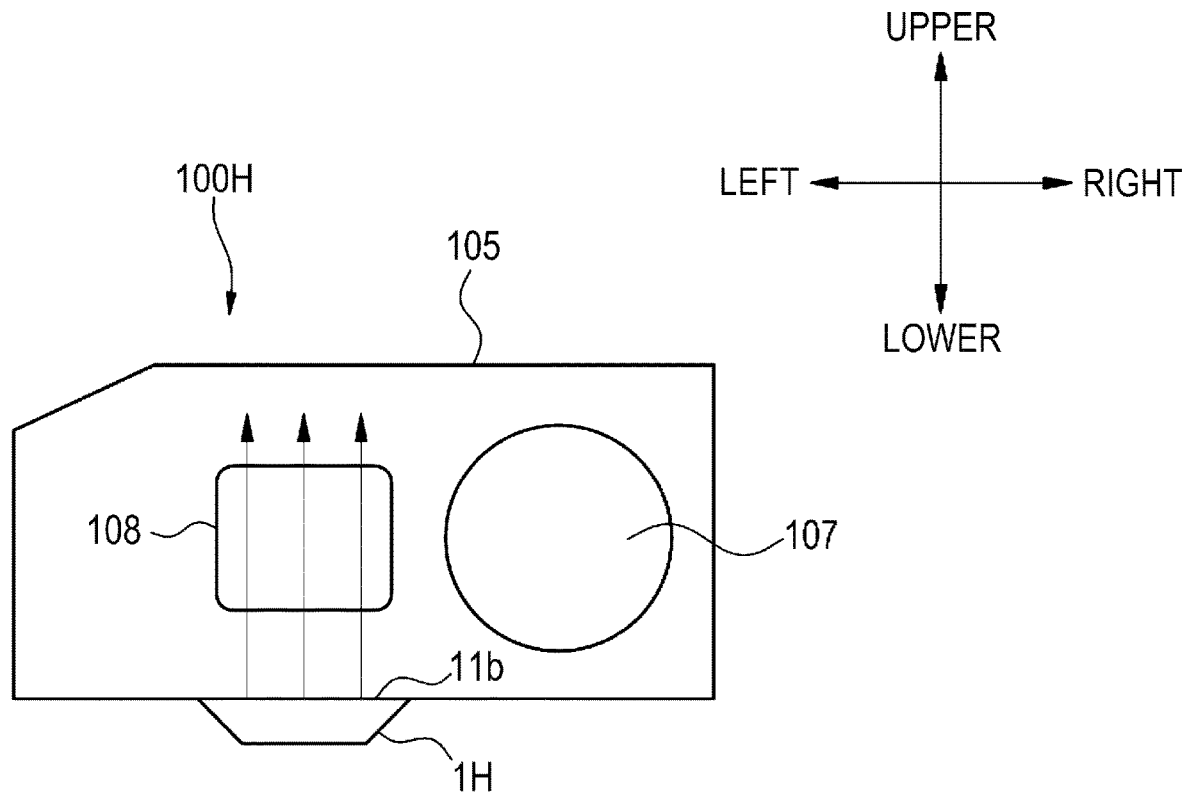
FIG. 13A is a schematic front view of a vehicle cleaner system according to an eighth embodiment of the present disclosure.
Figure 13B:
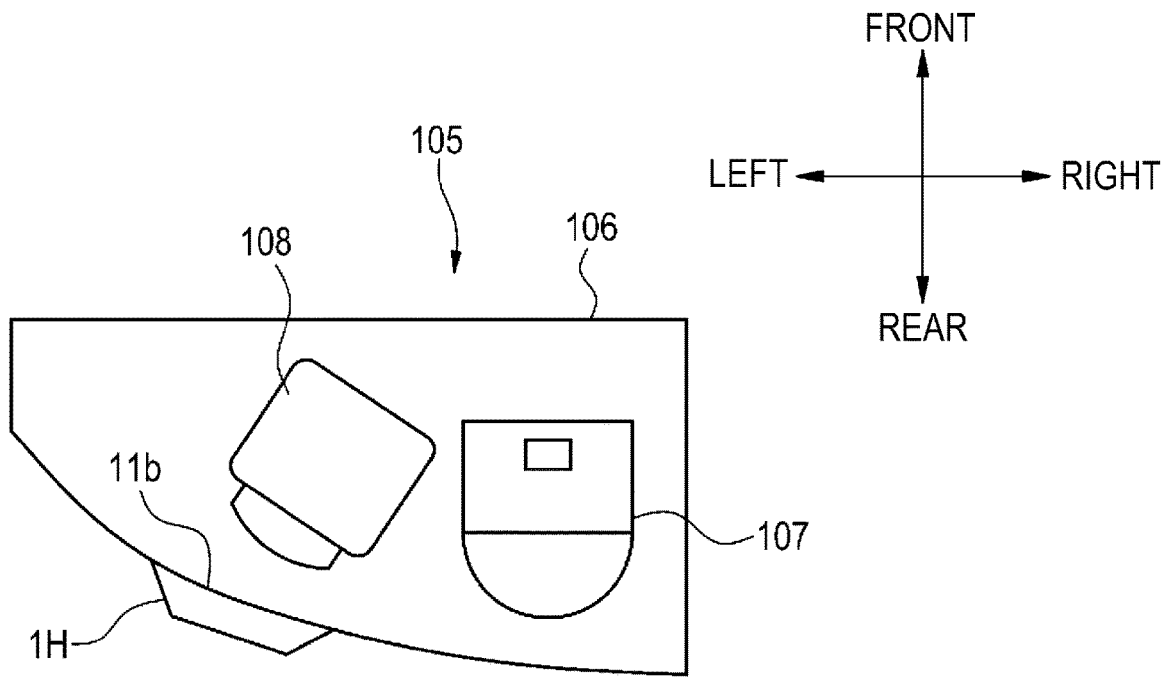
FIG. 13B is a schematic plan view of the cleaner system of FIG. 13A.

FIG. 13A is a schematic front view of a vehicle cleaner system according to an eighth embodiment, and FIG. 13B is a schematic plan view of the cleaner system shown in FIG. 13A.

As shown in FIG. 13A and FIG. 13B, a cleaner system 100H according to the eighth embodiment includes a rear lamp unit 105 mounted on a rear portion of a vehicle, and a cleaner unit 1H. FIGS. 13A and 13B show the rear lamp unit 105 provided on the left side of the rear portion of the vehicle. Since a right rear lamp has a configuration symmetrical to the left rear lamp unit 105, a detailed description thereof will be omitted.

A stop and tail lamp 107 and a camera 108 are housed in a housing 106 of the lamp unit 105. The stop and tail lamp 107 and the camera 108 are arranged in parallel along the left-right direction of the vehicle. In this example, the stop and tail lamp 107 is disposed on the right side (vehicle inner side) in the housing 106, and the camera 108 is disposed on the left side (vehicle outer side) in the housing 106.

The cleaner unit 1H has the same configuration as that of the cleaner unit 1B shown in FIG. 4. That is, the cleaner unit 1H configured with the air blower is attached to the lower surface of the housing 106 of the rear lamp unit 105. The blowout port 11b of the air blower of the cleaner unit 1H is provided at a position where the air can be jetted to the camera 108 among the stop and tail lamp 107 and the camera 108 which are arranged in parallel in the left-right direction. Specifically, the blowout port 11b of the cleaner unit 1H is provided below the camera 108 and can blow the air from the side below to the side above the camera 108. In a front view, the air may be jetted from the blowout port 11b toward a region corresponding to the camera 108 in the outer cover 119, or the air may be jetted toward the side below the region corresponding to the camera 108 in the outer cover 119.

As described above, according to the cleaner unit 1H and the cleaner system 100H according to the eighth embodiment, when the cleaner unit 1H is attached to the rear lamp unit 105 in which the stop and tail lamp 107 and the camera 108 are housed in the single housing 106 (sensor built-in lamp), the blowout port 11b of the cleaner unit 1H is provided at a position corresponding to the camera 108. Therefore, it is possible to effectively perform cleaning with respect to a sensor is highly required to maintain the cleanliness among the lamps (for example, the stop and tail lamps 107) and the sensors (for example, the camera 108) included in the sensor built-in lamp.

Ninth Embodiment

Figure 14A:
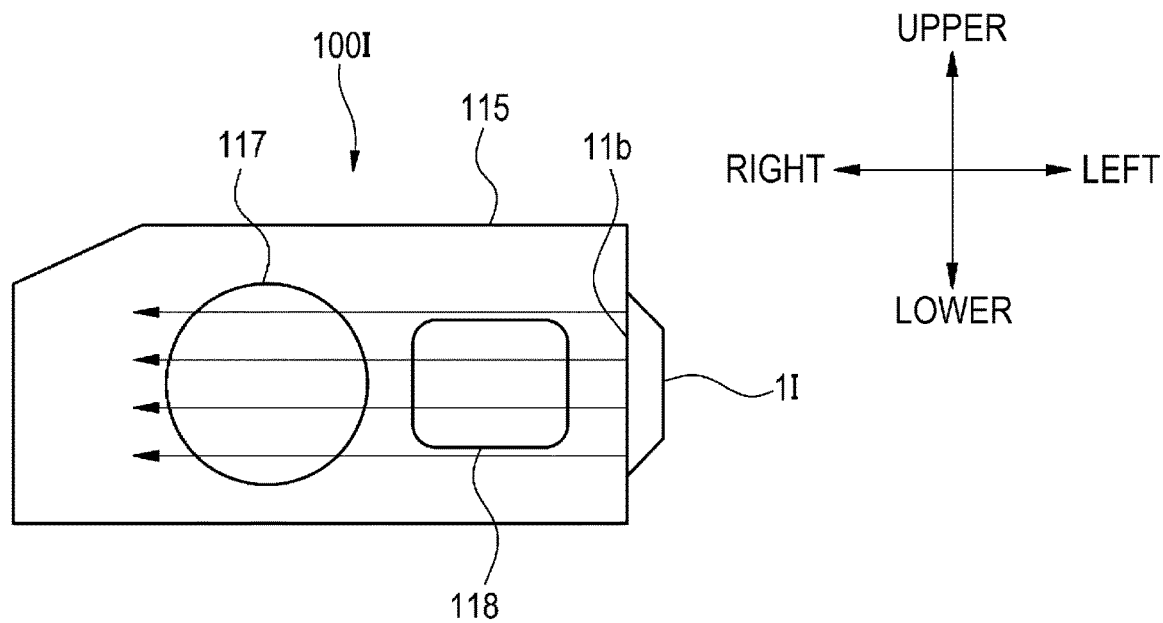
FIG. 14A is a schematic front view of a vehicle cleaner system according to a ninth embodiment of the present disclosure.
Figure 14B:
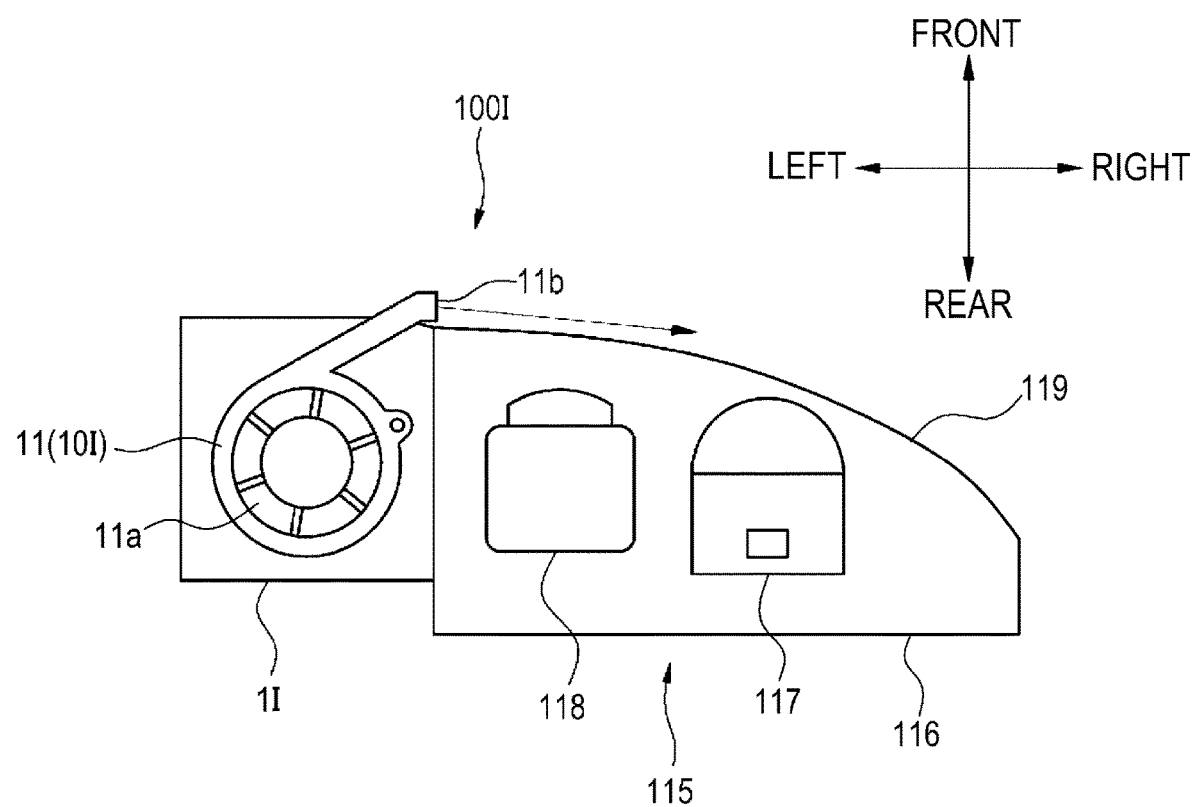
FIG. 14B is a schematic plan view of the cleaner system of FIG. 14A.

FIG. 14A is a schematic front view of a vehicle cleaner system according to a ninth embodiment, and FIG. 14B is a schematic plan view of the cleaner system shown in FIG. 14A.

As shown in FIG. 14A and FIG. 14B, a cleaner system 100I according to the ninth embodiment includes a headlamp unit 115 mounted on a front portion of a vehicle, and a cleaner unit 1I. FIGS. 14A and 14B show the headlamp unit 115 provided on the right side of the front portion of the vehicle. Since a left headlamp unit has a configuration symmetrical to the right headlamp unit 115, a detailed description thereof will be omitted.

A headlamp 117 and a camera 118 are housed in a housing 116 of the headlamp unit 115. The headlamp 117 and the camera 118 are arranged in parallel along the left-right direction of the vehicle. In this example, the headlamp 117 is disposed on the right side (vehicle outer side) in the housing 116, and the camera 118 is disposed on the left side (vehicle inner side) in the housing 116.

As in the case of the cleaner unit 1C illustrated in FIG. 5, the cleaner unit 1I is disposed on the left side of the headlamp unit 115 in the left-right direction, that is, on the vehicle inner side with respect to the headlamp unit 115. It is preferable that the cleaner unit 1I is attached in contact with a left side surface of the housing 116. The air jetted from the blowout port 11b of an air blower 10I toward the headlamp 117 is sent out from the inner toward the outer side in the left-right direction of the vehicle along a streamlined shape of an outer cover 119 provided at the front portion of the housing 116. In the case of the right headlamp unit 115 shown in FIGS. 14A and 14B, the outer cover 119 is formed in a manner gradually inclined rearward toward the outer side in the left-right direction of the vehicle. The air jetted from the blowout port 11b of the air blower 10I is sent out from the left side to the right side along the inclination of the outer cover 119.

As described above, according to the cleaner unit 1I and the cleaner system 100I according to the ninth embodiment, when a single cleaner unit is to be attached with respect to a plurality of cleaning objects, the plurality of cleaning objects and the blowout port of the cleaner unit are arranged on the same straight line. That is, when the cleaner unit 1I is to be attached with respect to the headlamp unit 115 in which the headlamp 117 and the camera 118 are mounted in parallel to each other on the left and right (sensor built-in lamp), the headlamp 117, the camera 118, and the blowout port 11b of the cleaner unit 1I are arranged on the same straight line in the left-right direction. By adopting an efficient layout of a cleaner unit with respect to a plurality of cleaning objects, cleaning can be performed more effectively.

In the cleaner system 100I, the camera 118 is disposed at a position closer to the blowout port 11b of the air blower 10I than the headlamp 117 is. In this way, by arranging the camera 118, which needs to maintain a higher cleanliness than the headlamp 117, closest to the blowout port 11b, it is possible to perform effective cleaning.

Tenth Embodiment

Figure 15B:
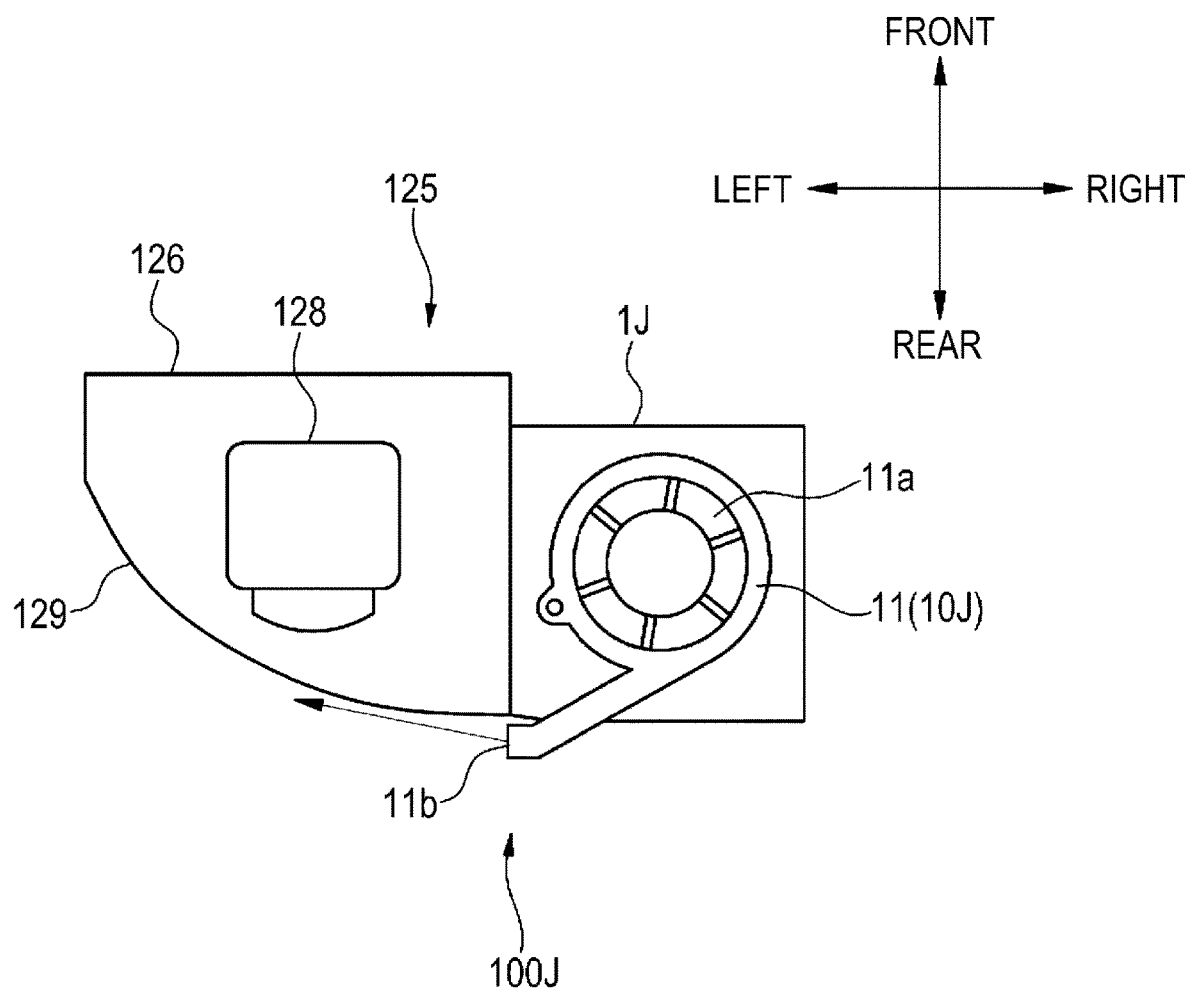
FIG. 15B is a schematic plan view of the cleaner system of FIG. 15A.

FIG. 15A is a schematic front view of a vehicle cleaner system according to a tenth embodiment, and FIG. 15B is a schematic plan view of the cleaner system shown in FIG. 15A.

As shown in FIGS. 15A and 15B, a cleaner system 100J according to the tenth embodiment includes a rear lamp unit 125 and a cleaner unit 1J. FIGS. 15A and 15B show the rear lamp unit 125 provided on the left side of the rear portion of the vehicle. Since a right rear lamp unit has a configuration symmetrical to the left rear lamp unit 125 shown in FIGS. 15A and 15B, a detailed description thereof will be omitted.

A turn signal lamp 127A, a stop and tail lamp 127B, and a camera 128 are housed in a housing 126 of the rear lamp unit 125. The turn signal lamp 127A, the stop and tail lamp 127B, and the camera 128 are arranged in parallel in the same straight line along the upper-lower direction of the vehicle. In this example, the turn signal lamp 127A is disposed in an uppermost part in the housing 126, the stop and tail lamp 127B is disposed below the turn signal lamp 127A, and the camera 128 is disposed further below the stop and tail lamp 127B.

The cleaner unit 1J is disposed on the left side of the rear lamp unit 125 in the left-right direction, that is, on the vehicle inner side with respect to the rear lamp unit 125. The cleaner unit 1J, particularly the blowout port 11b thereof, is disposed at a position corresponding to the camera 128, which is disposed at a lowermost part among the turn signal lamp 127A, the stop and tail lamp 127B, and the camera 128 mounted on the rear lamp unit 125. It is preferable that the cleaner unit 1J is attached in contact with a lower portion of the left side surface of the housing 116. The air jetted from the blowout port 11b of an air blower 10J toward the rear lamp unit 125 is sent out from the inner toward the outer side in the left-right direction of the vehicle along a streamlined shape of an outer cover 129 provided at the front portion of the housing 126. In the case of the left rear lamp unit 125 shown in FIGS. 15A and 15B, the outer cover 129 is formed in a manner gradually inclined rearward toward the outer side in the left-right direction of the vehicle. The air jetted from the blowout port 11b of the air blower 10J is sent out from the left side to the right side along the inclination of the outer cover 129.

As described above, according to the cleaner unit 1J and the cleaner system 100J according to the tenth embodiment, when a single cleaner unit is attached to a plurality of cleaning objects arranged on the same straight line along an upper-lower direction of a vehicle, a blowout port of the cleaner unit is arranged to jet air to a position corresponding to a cleaning object arranged at a lowest position among the plurality of cleaning objects. That is, when the cleaner unit 1J is attached to the rear lamp unit 125 in which the turn signal lamp 127A, the stop and tail lamp 127B, and the camera 128 are mounted in parallel in the upper-lower direction (sensor built-in lamp), the blowout port 11b of the cleaner unit 1J is disposed to jet air to a position corresponding to the camera 128 which is arranged lowermost. As described above, when a single cleaner unit is attached to a plurality of cleaning objects arranged in parallel in the upper-lower direction, a cleaning object requiring a high degree of cleanliness is arranged lowermost, and the air is jetted from the cleaner unit toward this cleaning object, so that effective cleaning can be performed with respect to the cleaning object. In addition, snow accretion or the like can be removed from the lower portion of the outer cover 129 of the rear lamp unit 125 where snow accretion or the like tends to accumulate. As a result, the snow accretion adhering to the area of the outer cover 129 corresponding to the turn signal lamp 127A and the stop and tail lamp 127B, which are mounted above the camera 128, flows downward as well, so that it is also possible to prevent adverse effects on the illumination function of the lamps 127A and 127B.

Eleventh Embodiment

Figure 16A:
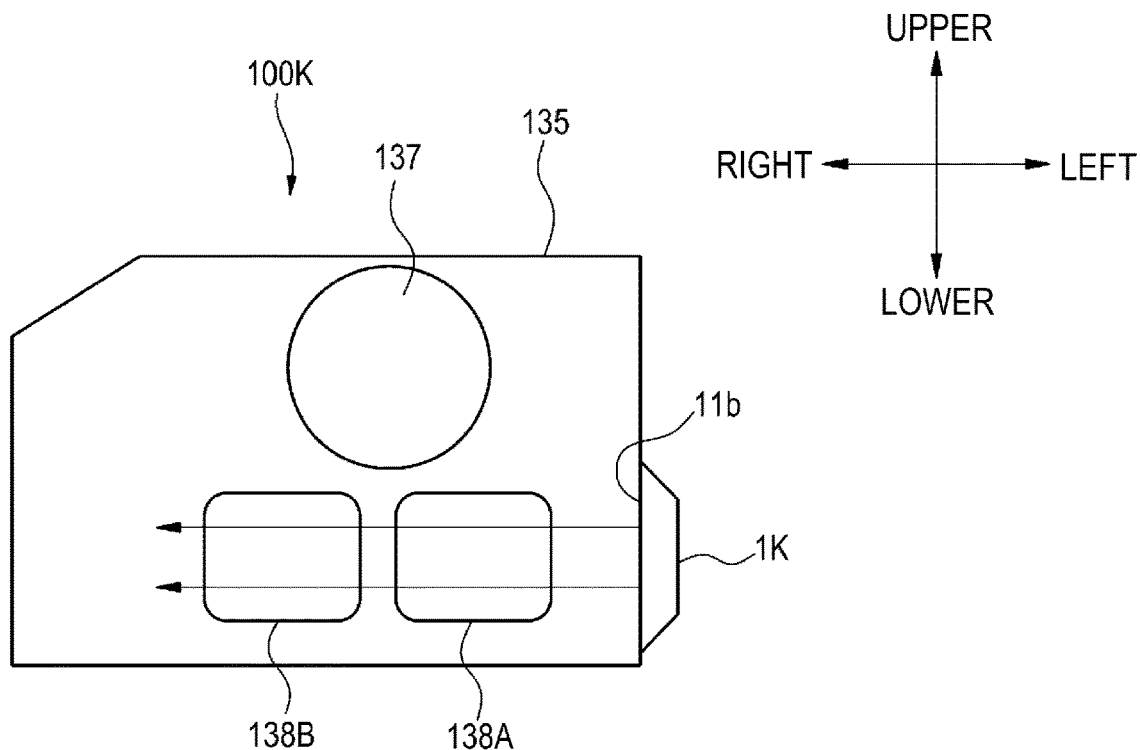
FIG. 16A is a schematic front view of a vehicle cleaner system according to an eleventh embodiment of the present disclosure.
Figure 16B:
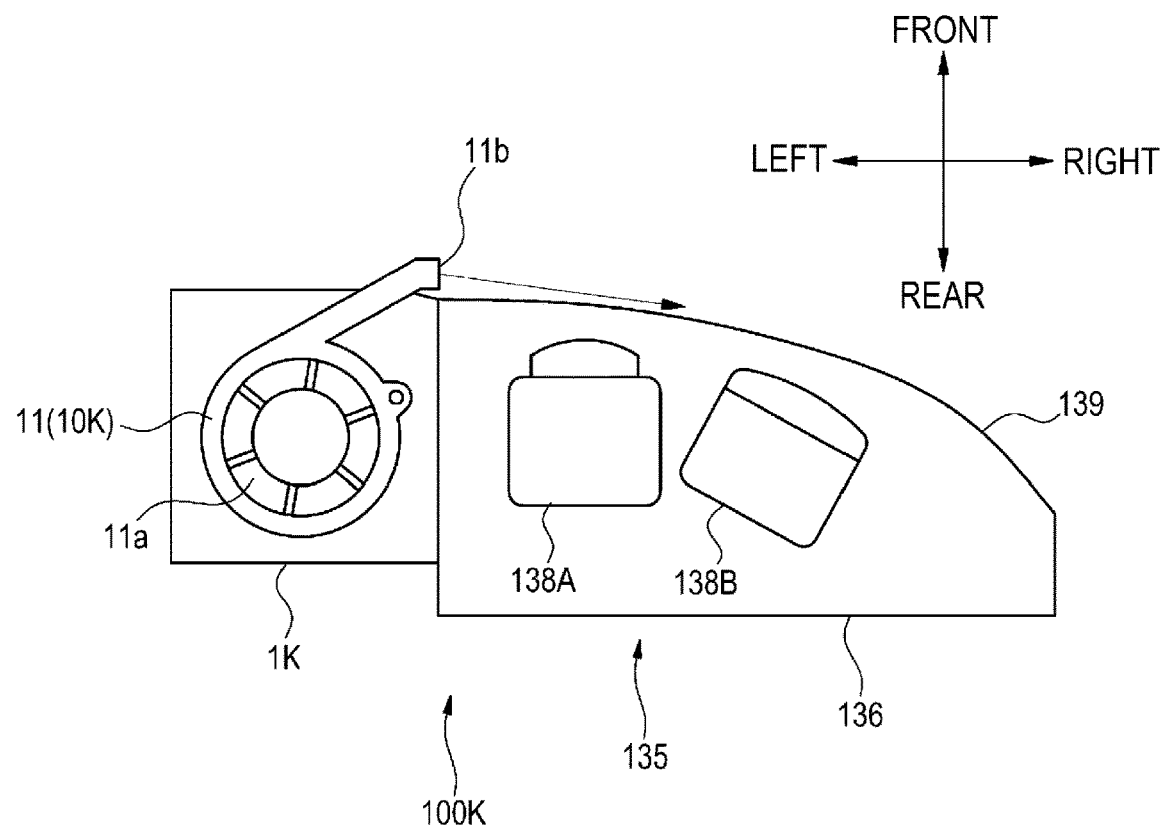
FIG. 16B is a schematic plan view of the cleaner system of FIG. 16A.

FIG. 16A is a schematic front view of a vehicle cleaner system according to a tenth embodiment, and FIG. 16B is a schematic plan view of the cleaner system shown in FIG. 16A.

As shown in FIGS. 16A and 16B, a cleaner system 100K according to the tenth embodiment includes a headlamp unit 135 and a cleaner unit 1K. FIGS. 16A and 16B show the headlamp unit 135 provided on the right side of the front portion of the vehicle. Since a left headlamp unit has a configuration symmetrical to the right headlamp unit 135 shown in FIGS. 16A and 16B, a detailed description thereof will be omitted.

A headlamp 137, a camera 138A, and a LiDAR 138B are housed in a housing 136 of the headlamp unit 135. The camera 138A and the LiDAR 138B are arranged in parallel along the left-right direction of the vehicle. In this example, the camera 138A is disposed on the left side in the housing 136, and the LiDAR 138B is disposed on the right side in the housing 136. The camera 138A and the LiDAR 138B may be disposed at positions opposite to those of the present embodiment in the left-right direction. In addition, the headlamp 137 is disposed above the camera 138A and the LiDAR 138B arranged in parallel.

As in the case of the cleaner unit 1I illustrated in FIGS. 14A and 14B, the cleaner unit 1K is disposed on the left side of the headlamp unit 135 in the left-right direction, that is, on the vehicle inner side with respect to the headlamp unit 135. The cleaner unit 1K, particularly the blowout port 11b thereof, is disposed at a position corresponding to the camera 138A and the LiDAR 138B, which are disposed at a lower part in parallel among the headlamp 137, the camera 138A, and the LiDAR 138B mounted on the headlamp unit 135. It is preferable that the cleaner unit 1K is attached in contact with a left side surface of the housing 136. The air jetted from the blowout port 11b of an air blower 10K toward the headlamp unit 135 is sent out from the inner toward the outer side in the left-right direction of the vehicle along a streamlined shape of an outer cover 139 provided at the front portion of the housing 136. In the case of the right headlamp unit 135 shown in FIGS. 16A and 16B, the outer cover 139 is formed in a manner gradually inclined rearward toward the outer side in the left-right direction of the vehicle. The air jetted from the blowout port 11b of the air blower 10K is sent out from the left side to the right side along the inclination of the outer cover 139.

As described above, according to the cleaner unit 1K and the cleaner system 100K according to the tenth embodiment, similar as in the tenth embodiment, when a single cleaner unit is attached to a plurality of cleaning objects arranged in parallel along an upper-lower direction of a vehicle, a blowout port of the cleaner unit is arranged to jet air to a position corresponding to a cleaning object arranged at a lowest position among the plurality of cleaning objects. That is, when the cleaner unit 1K is attached to the head unit 135 in which the headlamp 137 is arranged above the camera 138A and the LiDAR 138B arranged in parallel to the left and right of each other (sensor built-in lamp), the blowout port 11b of the cleaner unit 1K is disposed to jet air to a position corresponding to the camera 138A and the LiDAR 138B, which are arranged lower. As a result, it is possible to effectively clean the camera 138A and the LiDAR 138B which require a high degree of cleanliness, and to also prevent adverse effects on the illumination function of the headlamp 137 provided above the camera 138A and the LiDAR 138B.

Although the embodiments of the present disclosure have been described above, it is needless to say that the technical scope of the present disclosure should not be construed as being limited by the description of the embodiments. It is to be understood by those skilled in the art that the present embodiments are merely examples and various modifications may be made within the scope of the invention described in the claims. The technical scope of the present disclosure should be determined based on the scope of the invention described in the claims and the scope of equivalents thereof.

This application is based on Japanese Patent Application No. 2018-242209 filed on Dec. 26, 2018, Japanese Patent Application No. 2018-242210 filed on Dec. 26, 2018, Japanese Patent Application No. 2018-242211 filed on Dec. 26, 2018, Japanese Patent Application No. 2018-242212 filed on Dec. 26, 2018, Japanese Patent Application No. 2018-242213 filed on Dec. 26, 2018, Japanese Patent Application No. 2018-242214 filed on Dec. 26, 2018, Japanese Patent Application No. 2018-242215 filed on Dec. 26, 2018, and Japanese Patent Application No. 2019-104462 filed on Jun. 4, 2019, contents of which are incorporated herein by reference.

The invention claimed is:

1. A vehicle cleaner unit configured to clean a cleaning object mounted near a front bumper or a front grille provided with an air outlet, the vehicle cleaner unit comprising:

a blower including a suction port for sucking air and a blowout port for blowing out the air toward the cleaning object through the air outlet when the blower is in operation, a closing mechanism configured to move the blowout port relative to the air outlet from an operation position at which the blower is in operation to a closing position at which the blowout port is not communicated with the air outlet when the blower is not in operation, and a control unit configured to output control signals for the blower and the closing mechanism.

2. A vehicle cleaner unit configured to clean a cleaning object mounted on a vehicle design component provided with an air outlet, the vehicle cleaner unit comprising:

a blower including a suction port for sucking air and a blowout port for blowing out the air toward the cleaning object through the air outlet when the blower is in operation, a closing mechanism configured to move the blowout port relative to the air outlet from a first position at which the blower is in operation to a second position at which the blowout port is not communicated with the air outlet when the blower is not in operation, and a control unit configured to output control signals for the blower and the closing mechanism.

3. The vehicle cleaner unit according to claim 2, wherein the vehicle design component is a front bumper, a rear bumper, or a front grille.

4. The vehicle cleaner unit according to claim 1, wherein the cleaning object is at least one of a vehicle lamp or an in-vehicle sensor.

\* \* \* \* \*